United States Patent
Rao et al.

(10) Patent No.: US 11,917,011 B2
(45) Date of Patent: Feb. 27, 2024

(54) RESILIENT RENDERING FOR AUGMENTED-REALITY DEVICES

(71) Applicant: META PLATFORMS TECHNOLOGIES, LLC, Menlo Park, CA (US)

(72) Inventors: Zhiqing Rao, Redmond, WA (US); Eugene Gorbatov, Sammamish, WA (US); Chris Rojas, Seattle, WA (US); Dong Zheng, Saratoga, CA (US); Cheng Chang, Redmond, WA (US); Yuting Fan, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 26 days.

(21) Appl. No.: 17/572,439

(22) Filed: Jan. 10, 2022

(65) Prior Publication Data
US 2023/0224369 A1  Jul. 13, 2023

(51) Int. Cl.
*G06T 19/00* (2011.01)
*H04L 67/131* (2022.01)
*H04W 24/08* (2009.01)

(52) U.S. Cl.
CPC .......... *H04L 67/131* (2022.05); *G06T 19/006* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 8,549,405 | B2 * | 10/2013 | Bugenhagen | H04L 41/5009 709/224 |
| 9,792,029 | B1 | 10/2017 | Cooley et al. | |

(Continued)

FOREIGN PATENT DOCUMENTS

EP    2919098 A1    9/2015

OTHER PUBLICATIONS

International Search Report and Written Opinion for International Application No. PCT/US2022/054089, dated Apr. 6, 2023, 9 pages.
(Continued)

*Primary Examiner* — David H Chu
(74) *Attorney, Agent, or Firm* — Morgan, Lewis & Bockius LLP

(57) ABSTRACT

A method by a rendering device includes receiving a request to render multiple surfaces corresponding to multiple virtual objects to be concurrently displayed on an augmented-reality (AR) headset. The method further includes that the AR headset is connected to the rendering device via a wireless link. In response to a determination that a network quality of the wireless link is below a threshold condition, the method further includes selecting a first subset of the multiple surfaces that are higher priority than a second subset of the plurality of surfaces. The method includes transmitting the first subset of multiple surfaces to the AR headset for display and transmitting the second subset of multiple surfaces to the AR headset for display after transmitting the first subset. This method includes rendering the surfaces in accordance with a set of rendering parameters so as to satisfy one or more network constraints.

20 Claims, 7 Drawing Sheets

(56) References Cited

U.S. PATENT DOCUMENTS

| | | | |
|---|---|---|---|
| 10,319,346 B2* | 6/2019 | Kikuchi | G06F 3/012 |
| 2008/0019371 A1* | 1/2008 | Anschutz | H04L 47/32 |
| | | | 370/394 |
| 2015/0138219 A1* | 5/2015 | Zacharias | H04L 67/10 |
| | | | 345/581 |
| 2015/0141120 A1* | 5/2015 | Gordon | H04L 67/10 |
| | | | 463/31 |
| 2015/0141143 A1* | 5/2015 | Gordon | A63F 13/355 |
| | | | 463/31 |
| 2017/0069054 A1 | 3/2017 | Ramadoss et al. | |
| 2017/0140570 A1 | 5/2017 | Leibel et al. | |
| 2017/0345212 A1* | 11/2017 | Palmieri | G02B 27/0172 |
| 2018/0039317 A1 | 2/2018 | Riguer | |
| 2018/0286004 A1 | 10/2018 | Babu et al. | |
| 2018/0288423 A1* | 10/2018 | Vembar | G06T 9/00 |
| 2018/0352255 A1* | 12/2018 | Hinds | H04N 19/115 |
| 2018/0359189 A1 | 12/2018 | Ye et al. | |
| 2019/0164518 A1 | 5/2019 | Dimitrov | |
| 2019/0200054 A1* | 6/2019 | Dharmaji | H04N 21/4788 |
| 2019/0279407 A1* | 9/2019 | McHugh | G06F 3/011 |
| 2020/0058152 A1 | 2/2020 | Zhang et al. | |
| 2020/0218330 A1 | 7/2020 | Schluessler et al. | |
| 2020/0280496 A1* | 9/2020 | Oetting | H04L 63/107 |
| 2021/0027752 A1 | 1/2021 | Holmes et al. | |
| 2021/0049983 A1* | 2/2021 | Seiler | G06F 3/013 |
| 2021/0096620 A1 | 4/2021 | Ramadoss et al. | |
| 2021/0136397 A1 | 5/2021 | Lakshmikantha et al. | |
| 2021/0146240 A1* | 5/2021 | Colenbrander | |
| | | | H04N 21/234381 |
| 2022/0067982 A1 | 3/2022 | Pardeshi et al. | |

OTHER PUBLICATIONS

International Search Report and Written Opinion for International Application No. PCT/US2023/010001 dated Apr. 14, 2023, 10 pages.

* cited by examiner

RESILIENT RENDERING FOR AUGMENTED-REALITY DEVICES

TECHNICAL FIELD

This disclosure generally relates to augmented-reality (AR) environments, and, more particularly, to rendering graphics for AR environments.

BACKGROUND

An augmented-reality (AR) system may generally include a real-world environment that includes AR content overlaying one or more features of the real-world environment. In typical AR systems, image data corresponding to virtual objects may be rendered on, for example, a head-mounted display (HMD) that may be coupled through a physical wired or wireless connection to a base graphics generation device, or rendering device, responsible for generating the image data. In some instances, lightweight AR glasses and/or other lightweight wearable electronic devices may include reduced processing power, low resolution cameras, and/or relatively simple tracking optics, which present problems associated with providing high quality AR content and transmitting image data in poor wireless network conditions. Thus, it may be useful to provide techniques to improve latency-resilient rendering of surfaces for AR systems in poor wireless network conditions.

SUMMARY OF PARTICULAR EMBODIMENTS

The invention of this disclosure is directed to addressing problems associated with providing high-quality AR content in poor wireless conditions consisting of high latency, low bandwidth, or other constraints. AR technology has long been challenged by the problem of latency in rendering virtual objects on an AR device. If there are poor wireless conditions connecting the rendering device and the AR device, image data transmitted to the AR device may be lost when multiple frames or packets are dropped during transmission of the image data. Packet loss may result in a failure to display complete images, or only display partial images on the AR device. Additionally, latency may result in a lag between what the user of the AR device intends to focus on, and what is displayed on the AR device. Lag and partially rendered virtual objects are especially pronounced when the geometry of the surface is complex or when a plurality of virtual objects need to be displayed. For example, to create an immersive environment, users may need to be able to move their heads around when viewing an environment to focus on different virtual objects or scenes within the environment. As such, an AR device must be able to quickly modify scenes and virtual objects corresponding with the user's head movement. Latency between the user's head movement and rendering of the environment on the AR device may cause the user to experience uncomfortable sensory dissonance. Re-rendering an environment in its entirety to account for the changes in user perspective is resource-intensive and may only be possible to accomplish at a low frame frate (e.g., 60 Hz, or once every $\frac{1}{60}^{th}$ of a second). Generally, to prevent the user from experiencing lag, objects in the environment should be rendered at a rapid pace (e.g., at least 200 Hz, or once every $\frac{1}{200}^{th}$ of a second). One solution involves working with "surfaces" that represent virtual objects within the AR environment. The surfaces correspond to one or more virtual objects that are expected to move, translate, skew, scale, distort, or otherwise change in appearance together, as one unit. The computing system of a rendering device may determine properties of these surfaces and dynamically adjust a plurality of parameters in accordance with the current wireless network quality. The present embodiments are directed toward various resilient rendering techniques that may be utilized by a rendering device for rendering one or more surfaces to a user of an AR device.

The present embodiments aim to provide a latency-resilient AR experience by utilizing a split computing architecture, wherein the graphics processing unit (GPU) of a rendering device may receive a request to display image data, evaluate wireless network conditions, and adjust a plurality of parameters before transmitting the image data to the AR device for display. By decoupling the frame rate between the rendering device and the HMD, the rendering device has flexibility to adjust how image data corresponding to virtual objects are to be transmitted to the HMD for display.

For example, in particular embodiments, the rendering device may receive a request to render a plurality of surfaces corresponding to a plurality of virtual objects to be concurrently displayed on an augmented-reality (AR) headset. In particular embodiments, the AR headset may be connected to the rendering device via a wireless link. In particular embodiments, in response to a determination that a network quality of the wireless link is below a threshold condition, the rendering device may determine that a subset of the plurality of surfaces are higher priority than other subsets. For example, the rendering device may select a first subset of the plurality of surfaces that are higher priority than a second subset of the plurality of surfaces, transmit the first subset of the plurality of surfaces to the AR headset for display, and then transmit the second subset of the plurality of surfaces to the AR headset for display. It is understood that the second subset of the plurality of surfaces are transmitted after the first subset of the plurality of surfaces The computing system of the rendering device may determine properties of these surfaces, such as the resolution of the surfaces and/or the dimensionality of the surfaces (two dimensional (2-D) or three-dimensional (3D)). In particular embodiments, based on the properties of the plurality of surfaces, the rendering device may divide the plurality of surfaces into subsets, and based on the properties of each subset, apply one or more resilient rendering techniques, and further prioritize one or more first subsets over one or more second subsets for transmission to the AR device.

In particular embodiments, one resilient rendering technique may be to adjust the image quality, or resolution, of one or more individual surfaces. The rendering device may determine that the quality and resolution of the one or more surfaces needs to be reduced based on a determination of poor network conditions. In particular embodiments, the rendering device may need to perform the actions of resetting the streaming of image data from the rendering device to the AR device, reallocate memory of the rendering device, and reduce the data rate of transmission from the rendering device to the AR device.

In particular embodiments, one resilient rendering technique may be to prioritize surfaces. In one embodiment, the rendering device may determine that 3D surfaces are higher priority than 2D surfaces, and as a result, transmit the 3D surfaces in a first subset of surfaces to the AR headset, with 2D surfaces being transmitted in a subsequent subset. Further, the rendering device may translate 3D surfaces into 2D surfaces in response to the wireless conditions. In particular embodiments, one or more surfaces that need to be updated first may be given higher priority. In particular embodiments, surfaces intended to be world-locked may be determined to be a higher priority for transmission than head-locked surfaces.

In particular embodiments, one resilient rendering technique may be rate control. In response to a determination of the current wireless condition, the rendering device may perform rate control, wherein the rendering transmits the surface data at a reduced bit rate, thereby reducing the data rate.

In particular embodiments, one resilient rendering technique may be multiple interval surface transfer. In response to a determination of the wireless condition, the rendering device may transfer a single surface, or a plurality of single surfaces in multiple intervals. To do this, the rendering device may adapt the frames per second to the available wireless bandwidth given current levels of wireless channel utilization and transmit a single surface over multiple wireless intervals. In particular embodiments, surfaces within the same subset may be distributed into multiple system intervals to reduce the occurrence of consecutive frame drop, which impacts user experience.

In particular embodiments, one resilient rendering technique may be content aware wireless scheduling and fencing. In particular embodiments, the rendering device may rotate the scheduling of one or more surfaces within the same subset to avoid the frame rates of one surface being consistently dropped. Further, in particular embodiments, the rendering device may perform deficit-based dynamic thermal fencing, in which the active duty cycle time may be adjusted so that either both left and right eye surfaces may be concurrently transmitted or neither will be transmitted. If the rendering device determines that dropping, for example, four frames will cause judder, the rendering device may determine and execute a temporary solution, wherein one or two out of the four frames with extended transmission times will be transmitted to the AR device, while skipping the remaining two or three frames.

In particular embodiments, one resilient rendering technique may be to reduce content in response to a determination of the wireless network condition by the rendering device. Similarly, in response to a determination of the wireless network condition by the rendering device, the rendering device may reduce the field of view (FoV), wherein a reduced number of pixels may be transmitted to the AR device for display. In particular embodiment, one resilient rendering technique may be to reduce content frames per second (FPS). For example, and not by way of limitation, a surface with 45 FPS may be reduced to 30 FPS with a system interval change (or 22.5 without a system interval change). In particular embodiments, the technique of reducing content FPS may improve the perceivability of world-locked surfaces in an environment with judder.

In particular embodiments, one resilient rendering technique may be dimensionality adjustment. For example, in response to a determination of the wireless network condition by the rendering device, the rendering device may compress 3D surfaces into 2D surfaces, which may display the same surfaces, but with about $\frac{1}{10}^{th}$ the compression size as compared to the original 3D surface. In particular embodiments, one resilient rendering technique may be to divide a surface into multiple surfaces. In response to a determination of the wireless network condition, the rendering device may determine to divide a surface with multiple wireless packets into multiple surfaces. Further, in particular embodiments, one resilient rendering technique may be to transmit one or more surfaces into encoding friendly material. In response to a determination of the wireless network condition, the rendering device may transmit one or more of the plurality of surfaces with, for example, more use of solid color, a gradient color schema, and/or low resolution texture.

Thus, in accordance with the foregoing embodiments, the present techniques may provide various rendering techniques that may be utilized by a rendering device for prioritizing and transmitting a plurality or subset of surfaces to an AR headset for display when the network quality of a wireless link is below threshold conditions. In this way, the device pipeline may be optimized to operate at the highest quality by managing the rendering workload and reducing the occurrences of consecutive frame rate drop.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
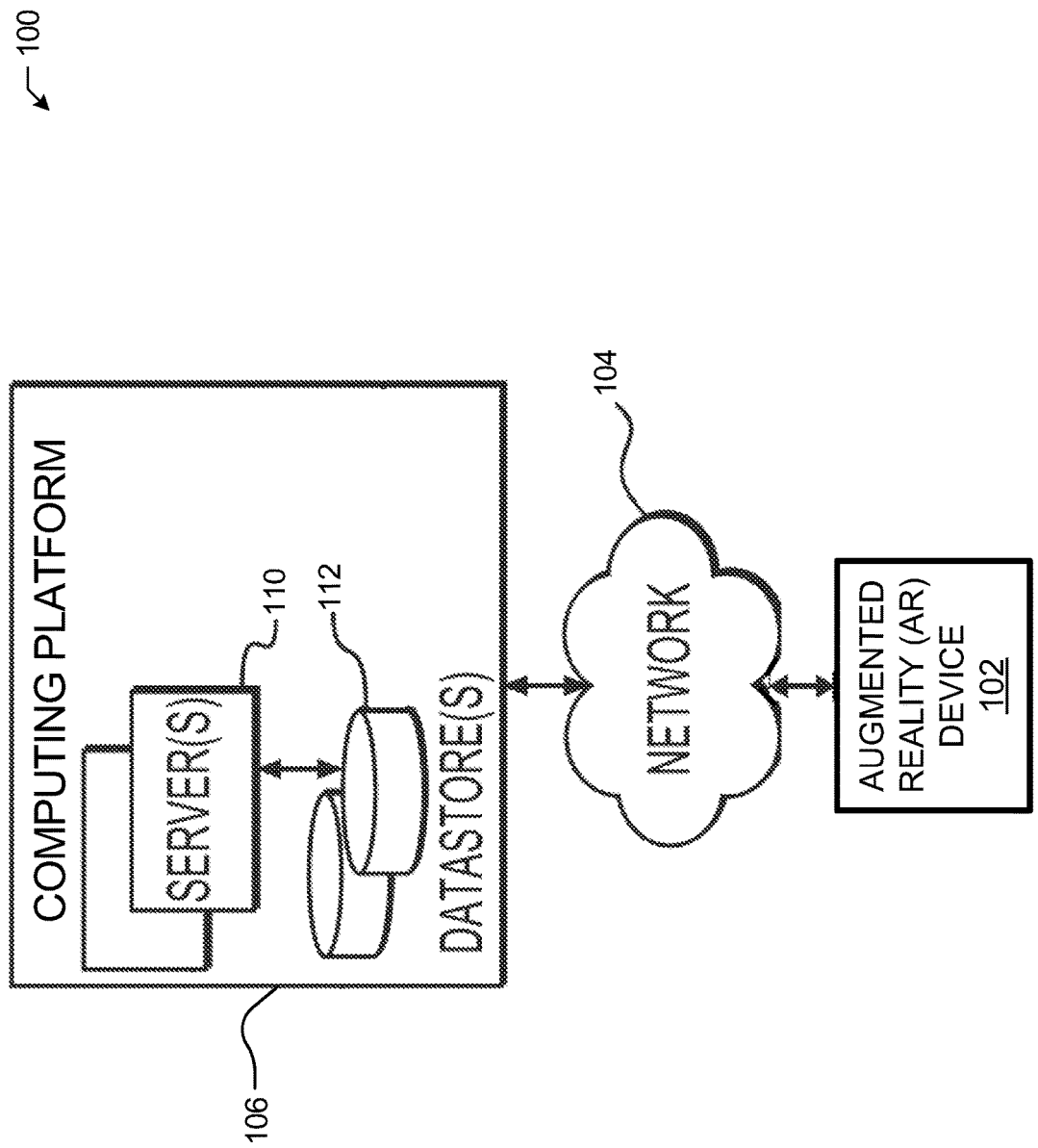
FIG. 1 illustrates an example augmented-reality (AR) system.

An augmented-reality (AR) system may generally include a real-world environment that includes AR content overlaying one or more features of the real-world environment. In typical AR systems, image data corresponding to virtual objects may be rendered on, for example, a head-mounted display (HMD) that may be coupled through a physical wired or wireless connection to a base graphics generation device responsible for generating the image data. In instances in which the HMD includes for example, lightweight AR glasses and/or other wearable electronic devices as opposed to more robust headset devices, the AR glasses or other lightweight wearable electronic devices may, in comparison, include reduced processing power. As such, the present embodiments are directed towards an AR system with split computing architecture and various latency-resilient workload management techniques.

AR technology has long been challenged by the problem of latency in rendering virtual objects on AR devices. Embodiments of the invention may include split computing architecture, in which a rendering device may be communicatively coupled to a HMD via a shared wireless network. For example, and not by way of limitation, a user may be wearing a HMD on their head, and store the rendering device in various locations, such as, for example, the user's front pant pocket, back pants pocket, or backpack. If there are poor wireless conditions connecting the rendering device and the AR device, surfaces transmitted to the AR device may be lost when multiple frames or packets are dropped during transmission of the surfaces. Packet loss may result in judder, a failure to display complete images, or only display partial images on the AR device. Additionally, latency may result in a lag between what the user of the AR device intends to focus on and what is displayed on the AR device. Lag and partially rendered surfaces may be especially pronounced when the geometry of the surface is complex or when a plurality of surfaces need to be concurrently displayed. Further, to create an immersive environment, users may need to be able to move their heads around when viewing an environment to focus on different virtual objects or scenes within the environment. As such, an AR device must be able to quickly modify scenes and virtual objects corresponding with the user's head movement. Latency between the user's head movement and rendering of the environment on the AR device may cause the user to experience uncomfortable sensory dissonance. Re-rendering an environment in its entirety to account for the changes in user perspective is resource-intensive and may only be possible to accomplish at a low frame frate (e.g., 60 Hz, or once every $1/60^{th}$ of a second). Generally, to prevent the user from experiencing lag, objects in the environment should be rendered at a rapid pace (e.g., at least 200 Hz, or once every $1/200^{th}$ of a second).

One solution involves working with "surfaces" that represent virtual objects within the AR environment. The surfaces correspond to one or more virtual objects that are expected to move, translate, skew, scale, distort, or otherwise change in appearance together, as one unit. The computing system of a rendering device may determine properties of these surfaces and dynamically adjust a plurality of parameters in accordance with the current wireless network quality. In particular embodiments, there may be three types of surfaces: image surfaces, label surfaces, and mask surfaces. Image surfaces may be used to render shaded images, for example, video frames, static images, or scenes rendered by a GPU. As an example, and not by way of limitation, a static image (e.g., a virtual, customized billboard that changes based on the user viewing it) may be represented by an image surface. As another example and not by way of limitation, each frame of a dynamic video (e.g., an AR television that is "attached" to a physical object and warped appropriately) may be represented by an image surface. As another example and not by way of limitation, referencing, several avatars (e.g., a realistic avatar positioned in the scene) may be represented by an image surface. As another example and not by way of limitation, the dynamic object (e.g., a dynamic 3D model of a building) shown to multiple viewers concurrently to facilitate collaboration may be represented by an image surface. In particular embodiments, an image surface may store RGB (red-green-blue) components for one or more of its texels. In particular embodiments, an image surface may store RGBA (red-green-blue-alpha) components for one or more of its texels. The alpha component may be a value that specifies a level of transparency that is to be accorded to a texel. As an example and not by way of limitation, an alpha value of 0 may indicate that a texel is fully transparent, an alpha value of 1 may indicate that a texel is opaque, and alpha values in between may indicate a transparency level that is in between (the exact transparency level being determined by the value). An image surface may support any suitable image format. As an example and not by way of limitation, image surfaces may support both 16-bit and 32-bit pixel formats, with 4-bit to 10-bit RGB component sizes. In particular embodiments, each image format may have at least one bit for storing an alpha value (e.g., to allow for transparent regions).

In particular embodiments, label surfaces may store signed distances and color indexes and may be used to render objects that include solid color regions, for example, text, glyphs, and icons. As an example, and not by way of limitation, an AR book may include text that may be represented by one or more label surfaces. In particular embodiments, surfaces may be fixed to an object (e.g., a static or moving object) in the scene, may be fixed in space, or may be fixed relative to the user's head (e.g., such that it is not fixed to any particular object in the scene, but rather moves along with the user's head. As another example and not by way of limitation, a periodic table showcasing the elements in a combination of text and multi-colors may be represented by one or more label surfaces. In this example, the periodic table may be displayed relative to the user's head (e.g., such that it is not fixed to any particular object in the scene, but rather moves along with the user's head). As another example and not by way of limitation, lines of different colors and associated text related to different bus routes for navigation purposes may be represented by one or more label surfaces, which may be fixed in space or with respect to objects. As another example and not by way of limitation, text including augmented information about a bus (e.g., capacity, arrival time, information about the next bus stop) may be represented by one or more label surfaces, which may be fixed with respect to an object. The label surface may be of any suitable format. As an example and not by way of limitation, label surfaces may store 8 bits per texel including, for example, a 6-bit distance field value and a 2-bit index. As another example and not by way of limitation, dual label surfaces may store 16 bits per label texel (e.g., a first 6-bit distance field and a first 2-bit index, and a second 6-bit distance field and a second 2-bit index) to allow for specifying two signed distance functions. In particular embodiments, the indexes in these examples may be used to look up an RGBA color to use, depending on the high-order bit of the interpolated distance.

In particular embodiments, mask surfaces may store an alpha value (e.g., a value of 1) that may be used to occlude surfaces that are behind it. As an example and not by way of limitation, a mask surface may occlude a portion of the surface representing the AR object as the (real-world) hand of a user passes in front an AR object being displayed by the AR device. As such, the present embodiments are directed toward various resilient rendering techniques that may be utilized by a rendering device for rendering one or more image surfaces, label surfaces, mask surfaces, or other surfaces to a user.

The present embodiments aim to provide a latency-resilient AR experience by utilizing a split computing architecture, wherein the GPU of a rendering device may receive a request to display image data, evaluate wireless network conditions, and adjust a plurality of parameters before transmitting the image data to the AR device for display. By decoupling the frame rate between the rendering device and the HMD, the rendering device has flexibility to adjust how image data corresponding to virtual objects are to be transmitted to the HMD for display. The rendering device may include one or more processors, memory devices, cameras, sensors, battery, user input and user output functionalities.

For example, in particular embodiments, the rendering device may receive a request to render a plurality of surfaces corresponding to a plurality of virtual objects to be concurrently displayed on an augmented-reality (AR) headset. In particular embodiments, the AR headset may be connected to the rendering device via various wireless communications networks (e.g., WLAN, WAN, PAN, cellular, WMN, WiMAX, GAN, 6LowPAN, and so forth). In particular embodiments, in response to a determination that a network quality of the wireless link is below a threshold condition, the rendering device may determine that a subset of the plurality of surfaces are higher priority than other subsets. For example, the rendering device may select a first subset of the plurality of surfaces that are higher priority than a second subset of the plurality of surface, transmit the first subset of the plurality of surfaces to the AR headset for display, and then transmit the second subset of the plurality of surfaces to the AR headset for display after transmitting the first subset. The computing system of the rendering device may determine properties of these surfaces, such as the resolution of the surfaces and/or the dimensionality of the surfaces (two dimensional (2-D) or three-dimensional (3D)). In particular embodiments, based on the properties of the plurality of surfaces, the rendering device may divide the plurality of surfaces into subsets, and based on the properties of each subset, apply one or more resilient rendering techniques, and further prioritize one or more first subsets over one or more second subsets for transmission to the AR device.

In particular embodiments, one resilient rendering technique may be to adjust the image quality, or resolution, of one or more individual surfaces. The rendering device may determine that the quality and resolution of the one or more surfaces needs to be reduced based on a determination of poor network conditions. In particular embodiments, the rendering device may need to perform the actions of resetting the streaming of image data from the rendering device to the AR device, reallocate memory of the rendering device, and reduce the data rate of transmission from the rendering device to the AR device.

In particular embodiments, one resilient rendering technique may be to prioritize surfaces. In one embodiment, the rendering device may determine that 3D surfaces are higher priority than 2D surfaces, and as a result, transmit the 3D surfaces in a first subset of surfaces to the AR headset, with 2D surfaces being transmitted in a subsequent subset. In particular embodiments, one or more surfaces that need to be updated first may be given higher priority. In particular embodiments, surfaces intended to be world-locked may be determined to be a higher priority for transmission than head-locked surfaces.

In particular embodiments, one resilient rendering technique may be rate control. In response to a determination of the current wireless condition, the rendering device may perform rate control, wherein the rendering device transmits the surface data at a reduced bit rate, thereby reducing the data rate.

In particular embodiments, one resilient rendering technique may be multiple interval surface transfer. In response to a determination of the wireless condition, the rendering device may transfer a single surface, or a plurality of single surfaces in multiple intervals. To do this, the rendering device may adapt the frames per second to the available wireless bandwidth given current levels of wireless channel utilization and transmit a single surface over multiple wireless intervals. In particular embodiments, surfaces within the same subset may be distributed into multiple system intervals to reduce the occurrence of consecutive frame drop, which impacts user experience.

In particular embodiments, one resilient rendering technique may be content aware wireless scheduling and fencing. In particular embodiments, the rendering device may rotate the scheduling of one or more surfaces within the same subset to avoid the frame rates of one surface being consistently dropped. Further, in particular embodiments, the rendering device may perform deficit-based dynamic thermal fencing, in which the active duty cycle time may be adjusted so that either both left and right eye surfaces may be concurrently transmitted or neither will be transmitted. If the rendering device determines that dropping, for example, four frames will cause judder, the rendering device may determine and execute a temporary solution, wherein one or two out of the four frames with extended transmission times will be transmitted to the AR device, while skipping the remaining two or three frames.

In particular embodiments, one resilient rendering technique may be to reduce content in response to a determination of the wireless network condition by the rendering device. Similarly, in response to a determination of the wireless network condition by the rendering device, the rendering device may reduce the field of view (FoV), wherein a reduced number of pixels may be transmitted to the AR device for display. In particular embodiment, one resilient rendering technique may be to reduce content frames per second (FPS). For example, and not by way of limitation, a surface with 45 FPS may be reduced to 30 FPS with a system interval change (or 22.5 without a system interval change). In particular embodiments, the technique of reducing content FPS may improve the perceivability of world-locked surfaces in an environment with judder.

In particular embodiments, one resilient rendering technique may be dimensionality adjustment. For example, in response to a determination of the wireless network condition by the rendering device, the rendering device may compress 3D surfaces into 2D surfaces, which may display the same surfaces, but with about $\frac{1}{10}^{th}$ the compression size as compared to the original 3D surface. In particular embodiments, one resilient rendering technique may be to divide a surface into multiple surfaces. In response to a determination of the wireless network condition, the rendering device may determine to divide a surface with multiple wireless packets into multiple surfaces. Further, in particular embodiments, one resilient rendering technique may be to transmit one or more surfaces into encoding friendly material. In response to a determination of the wireless network condition, the rendering device may transmit one or more of the plurality of surfaces with, for example, more use of solid color, a gradient color schema, and/or low resolution texture.

Accordingly, the present embodiments are directed toward various rendering techniques that may be utilized by an AR system for reducing or mitigating packet loss and/or packet error rate. In particular embodiments, the processing tasks associated with rendering surfaces and generating and modifying surfaces may be executed on a rendering device. The modified or adjusted surfaces may then be transmitted to the AR glasses for display. Each surface may be a representation of one or more objects. As an example, and not by way of limitation, an avatar of a person and a hat worn the avatar may correspond to one surface if it is determined that the person and the hat would move, translate, distort, or otherwise change appearance as one unit. In particular embodiment, a surface may be a rectangular "texture which may be a virtual concept that includes visual information (e.g., colors, transparency) defining one or more objects in a scene. The surface may also include a transformation matrix to specify its location in the scene. A surface's texture data may be made up of one or more subparts, referred to herein as "texels." These texels may be blocks (e.g., rectangular blocks) that come together to create a texel array that makes up a surface. As an example and not by way of limitation, they may be contiguous blocks that make up a surface. For illustrative purposes, a texel of a surface may be conceptualized as being analogous to a pixel of an image. As an example, and not by way of limitation, a CPU or GPU of the rendering device may generate the surfaces.

In particular embodiments, the computing system of the rendering device may determine whether to reduce or adjust a rendering workload associated with rendering the surfaces to satisfy the restraints of poor network conditions. For example, in particular embodiments, the computing system of the rendering device may prioritize and adjust surfaces in accordance with a determination of the wireless network conditions. The computing system of the rendering device may alter one or more parameters such as an altered frame rate, altered resolution, altered dimensionality (from 3D to 2D), altered bit depth, color channels, altered pose update threshold, altered depth continuity, altered content range, altered depth density, altered near-field depth, altered far-field depth, altered brightness, altered contrast, or altered tone.

In particular embodiments, a computing system of a rendering device may receive a request to render a plurality of surfaces to be concurrently displayed on an AR headset. The rendering device may include one or more processors. In particular embodiments, in response to the rendering device's determination that the network quality of the wireless link is below a threshold condition, the rendering device may select a first subset of the plurality of surfaces that are higher priority than a second subset of the plurality of surfaces. The rendering device may transmit the first subset of the plurality of surfaces to the AR headset for display and transmit the second subset of the plurality of surfaces to the AR headset for display after transmitting the first subset. As another example and not by way of limitation, an onboard computing system of a HMD may generate one or more surfaces after it receives the initial scene from a separate computing system (e.g., from a CPU or GPU of a wearable, handheld, or laptop device). In particular embodiments, there may be a predefined maximum number of surfaces that may be generated for a view (e.g., 16 surfaces) for efficiency purposes.

Thus, in accordance with the foregoing embodiments, the present techniques may provide various resilient rendering techniques that may be utilized by an AR system. For example, the present techniques may be provided to prioritize and alter various parameters of surfaces in accordance with wireless network quality.

FIG. 1 illustrates an example augmented-reality (AR) system 100 that may be suitable for displaying one or more surfaces, in accordance with presently disclosed embodiments. In particular embodiments, the AR system 100 may include an AR device 102, a network 104, and a computing platform 106. In particular embodiments, a user may wear the AR device 102 that may display visual extended reality content to the user. The AR device 102 may include an audio device that may provide audio extended reality content to the user. In particular embodiments, the AR device 102 may include one or more cameras which may capture images and videos of environments. The AR device 102 may include an eye tracking system to determine the vergence distance of the user. In particular embodiments, the AR device 102 may include a lightweight head-mounted display (HMD) (e.g., goggles, eyeglasses, spectacles, a visor, and so forth). In particular embodiments, the AR device 102 may also include a non-HMD device, such as a lightweight handheld display device or one or more laser projecting spectacles (e.g., spectacles that may project a low-powered laser onto a user's retina to project and display image or depth content to the user). In particular embodiments, the network 104 may include, for example, any of various wireless communications networks (e.g., WLAN, WAN, PAN, cellular, WMN, WiMAX, GAN, 6LowPAN, and so forth) that may be suitable for communicatively coupling the AR device 102 to the computing platform 106.

In particular embodiments, the computing platform 106 may include, for example, a standalone host computing system, an on-board computer system integrated with the AR device 102, a mobile device, a rendering device, a stage, or any other hardware platform that may be capable of providing extended reality content to the AR device 102. In particular embodiments, the computing platform 106 may include, for example, a cloud-based computing architecture (including one or more servers 108 and data stores 110) suitable for hosting and servicing AR applications or experiences executing on the AR device 102. For example, in particular embodiments, the computing platform 106 may include a Platform as a Service (PaaS) architecture, a Software as a Service (SaaS) architecture, and an Infrastructure as a Service (IaaS), or other similar cloud-based computing architecture. As it may be appreciated, in particular embodiments in which the AR device 102 includes lightweight devices, such as goggles, eyeglasses, spectacles, a visor, and so forth, the AR device 102 may, due to the smaller architectural area, include reduced power management (e.g., batteries, battery size) electronics. Thus, as will be further appreciated with respect to FIGS. 2, 3, 4, and 5, it may be useful to provide various techniques that may be utilized by a device for rendering content in poor wireless conditions.

Figure 2:
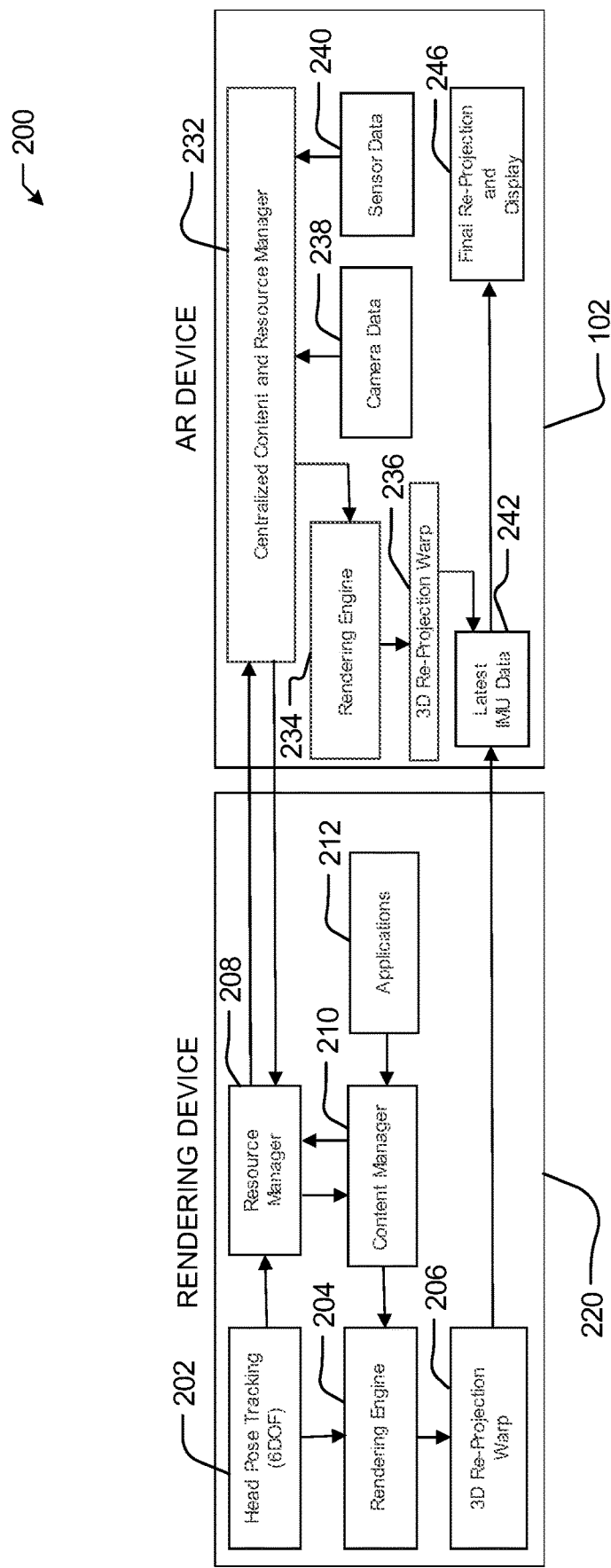
FIG. 2 illustrates a detailed embodiment of an augmented-reality (AR) system with an available network connection.

FIG. 2 illustrates a detailed embodiment of an augmented-reality (AR) system 200 for providing various resilient rendering techniques that may be utilized by a rendering device for rendering surfaces in varying wireless conditions, in accordance with presently disclosed embodiments. As depicted, the rendering device 220 may include a head pose tracking functional block 202, a rendering engine 204, a 3D re-projection warping functional block 206, a resource manager 208, a content manager 210, and applications 212. In particular embodiments, the rendering device 220 may generate surfaces corresponding to a sequence of image frames (e.g., (R)ed, (B)lue, (G)reen image data) via the rendering engine 204. In particular embodiments, the rendering device 220 may also access one or more depth maps corresponding to the surfaces. In particular embodiments, as further depicted, the rendering device 220 may also maintain and keep track of pose information (e.g., head pose data, object pose data) of one or more surfaces calculated by the head pose functional block 202 and pose data received from the AR device 102.

In particular embodiments, the rendering device 220 may host and service applications 212, which may include, for example, AR experiences executing on the AR device 102. For example, in particular embodiments, the applications 212 may include, for example, AR applications, such as video gaming applications (e.g., single-player games, multi-player games, first-person point of view (POV) games), mapping applications, music playback applications, video-sharing platform applications, video-streaming applications, e-commerce applications, social media applications, user interface (UI) applications, or other AR applications users 102 may experience. In particular embodiments, as further depicted by FIG. 2, the applications 212 or other AR content may be analyzed and managed by way of the content manager 210. For example, in particular embodiments, the content manager 210 may include, for example, any system (e.g., software system, frameworks, compositors, or other forms of middleware/runtime systems that manage scenes displayed by the AR device 102) that may be utilized to analyze and manage 3D content associated with the applications 212 to be rendered and displayed by the AR device 102. Similarly, the resource manager 208 may include, for example, any system (e.g., software system) that keeps track of the available hardware and/or software components for hosting and servicing the applications 212 or other AR content.

In particular embodiments, as further depicted by FIG. 2, the rendering device 220 may transform images into surfaces corresponding to the applications 212 or other AR content utilizing the rendering engine 204. In particular embodiments, the rendering engine 204 may then output the rendered surfaces to the 3D re-projection warping functional block 206, which may be utilized to compensate for network 104 latency for the viewpoint change in that the rendered frames are provided over the network 104 to the AR device 102. In particular embodiments, as further depicted, the rendered and warped frames may be then passed from the 3D re-projection warping functional block 206 over the network 104 to a latest IMU functional block 242 of the AR device 102. In particular embodiments, the latest IMU functional block 242 may be utilized to associate the rendered surfaces with the latest user head pose data and object pose data (e.g., real-time or near real-time head pose data and/or object pose data), for example, and re-project and display the surfaces 246 on the one or more displays of the AR device 102 to be interacted with by a user of the AR device 102.

In particular embodiments, as previously discussed above with respect to FIG. 1, in instances in which the AR device 102 includes, for example, lightweight AR glasses and/or other wearable electronic devices as opposed to more robust headset devices, the AR device 102 may, in comparison, include reduced processing power, low-resolution cameras, and/or relatively simple tracking optics. Additionally, due to poor wireless conditions, the AR device 102 may experience packet loss and consecutive frame drops. Thus, without the presently disclosed embodiments of providing resilient rendering techniques for reducing occurrences of consecutive frame drop in poor wireless conditions, the AR device 102 would otherwise be precluded from maximum performance in rendering surfaces, which impacts the user experience. For example, in certain embodiments, the AR device 102 may have to take actions to stay within limitations of network 104 transmission restraints. For example, the rendering device 220 may have to reduce the resolution of the surface, prioritize surfaces, transmit surfaces at lower bit rates, transmit the surfaces in multiple intervals, reduce the number of surfaces, reduce the FoV, reduce FPS, and so on.

For example, as further depicted by FIG. 2, in particular embodiments, the AR device 102 may include a centralized content and resource manager 232 (e.g., content and scene manager) that may be utilized to perform various resilient rendering techniques for mitigating frame drops. It should be appreciated that while the centralized content and resource manager 232 is displayed as being implemented on the AR device 102, in some embodiments, the centralized content and resource manager 232 can either reside on the rendering device 220 or the AR device 102, or be split and shared between the rendering device 220 and the AR device 102. For example, in some embodiments, the centralized content and resource manager 232 can be implemented in a software module as part of framework or be distributed between software and firmware modules. In some embodiments, the present rendering workload management techniques may be performed by the centralized content and resource manager 232 of the AR device 102 and post-rendering with respect to the rendering device 220 (e.g., after frames are generated and rendered by the rendering engine 234 of the rendering device 220 and provided to the AR device 102). In other embodiments, the present rendering workload management techniques may be performed by the centralized content and resource manager 232 while a rendering and displaying of one or more surfaces is already in-progress (e.g., in real-time or near real-time). Still, in other embodiments, the present resilient rendering techniques may be orchestrated solely by the centralized content and resource manager 232 of the AR device 102 and performed by the rendering engine 234 of the AR device 102 or by the rendering engine 204 of the rendering device 220.

In particular embodiments, the centralized content and resource manager 232 may monitor the condition of the network 104 (e.g., network 104 latency, network 104 quality, network 104 bandwidth, network 104 data throughput, and so forth) with respect to the determined rendering workload associated with rendering the one or more surfaces. For example, in some embodiments, the one or more surfaces may include AR content that may be latency sensitive (e.g., world-locked AR content may be constantly updated as the user's head pose changes). In accordance with the presently disclosed embodiments, the centralized content and resource manager 232 may thus analyze the AR content of the one or more surfaces, and, based on the condition of the network 104 and the determined rendering workload associated with rendering the one or more surfaces, dynamically switch between rendering the one or more surfaces utilizing the rendering engine 234 and associated one or more first GPUs of the AR device 102 and rendering the one or more surfaces utilizing the rendering engine 204 and associated one or more second GPUs of the rendering device 220.

For example, in particular embodiments, the content manager 210 and/or resource manager 208 of the rendering device 220 may provide, to the centralized content and resource manager 232, a request for surfaces associated with one or more applications 212 to be rendered and displayed by the AR device 102, and the centralized content and resource manager 232 may then determine the manner in which to render and display the requested surfaces. The centralized content and resource manager 232 may then carry out the rendering and displaying of the requested surfaces by instructing and utilizing the rendering engine 204 and 3D re-projection warp functional block 206. In one example embodiment, the centralized content and resource manager 232 may include, for example, any system (e.g., software system) that may be utilized to analyze, process, and manage surfaces of AR content to be rendered and displayed by the AR device 102. In another example embodiment, the centralized content and resource manager 232 may include, for example, any system (e.g., software system) that maintains and keeps track of the available hardware resources and/or software resources (e.g., power budgets, thermal budgets, camera data 238, sensor data 240, processing capacity, memory capacity, power consumption, processing time, network 104 bandwidth, network 104 latency, network 104 data throughput, network 104 quality, and so forth) to be utilized for rendering and displaying surfaces of AR content on the AR device 102.

In particular embodiments, in accordance with the presently disclosed techniques, the centralized content and resource manager 232 may receive a request to render one or more surfaces from the rendering device 220. For example, in particular embodiments, the centralized content and resource manager 232 may receive a request to render one or more surfaces corresponding to applications 212 or other AR content. In particular embodiments, the centralized content and resource manager 232 may determine associated image characteristic with respect to each object of the content of the one or more surfaces. For example, in particular embodiments, the centralized content and resource manager 232 may determine with respect to each object of the content of the one or more surfaces, a foveal region (e.g., based on camera data 238, the centralized content and resource manager 232 may determine and distinguish objects and content that are to be viewable in a foveal region of the user as opposed objects and content that may appear along the periphery of the user's view), an object dimension (e.g., the centralized content and resource manager 232 may determine and distinguish 3D objects and content from 2D objects and content), a viewing distance (e.g., distance away from the viewer), user interaction (e.g., a game may involve the user interacting with only certain objects while avoiding other objects), and so forth.

In particular embodiments, the centralized content and resource manager 232 may then determine whether to reduce a rendering workload associated with rendering the one or more surfaces to satisfy one or more network 104 constraints associated with the AR device 102.

In particular embodiments, the rendering engine 204 of the rendering device 220 may, in response to a determination to prioritize or alter the rendering workload, generate a set of rending parameters for rendering the one or more surfaces in response to a determination of network 104 quality. Rendering parameters may consist of one or more rendering techniques, as previously discussed. For example, and not by way of limitation, the rendering device 220 may generate a plurality of sets of rendering modes consisting of one or more rendering parameters. Rendering modes may be generated based on, for example, rendering parameters with a high user experience impact (e.g., reducing the amount of surfaces displayed to the user), rendering parameters with medium/high user experience impact (e.g., prioritizing surfaces that need to be updated first), rendering parameters with medium/low user experience impact (e.g., transmitting a single surface over multiple wireless intervals), and rendering parameters with low user experience impact (e.g., color characteristics, gradient color schema, etc.). In particular embodiments, rendering modes may be generated based on rendering parameters with varying degrees of bandwidth reduction. In particular embodiments, rendering modes may be generated based the impact of the power supply to the AR device 102 and/or the location of where each rendering parameter may execute (e.g., GPU or wireless).

In particular embodiments, the rendering engine 204 of the rendering device 220 may execute instructions to, based on the properties of the plurality of surfaces and the network 104 conditions, divide the plurality of surfaces into subsets, and based on the properties of each subset, apply one or more resilient rendering techniques and/or rendering modes, and further prioritize one or more first subsets over one or more second subsets for transmission to the AR device 102.

In particular embodiments, the rendering engine 204 of the rendering device 220 may execute instructions to, based on the properties of the plurality of surfaces and the network 104 conditions, adjust the image quality, or resolution, of one or more individual surfaces. The rendering device 220 may determine that the quality and resolution of the one or more surfaces needs to be reduced based on a determination of poor network 104 conditions. In particular embodiments, the rendering device 220 may need to perform the actions of resetting the streaming of image data from the rendering device to the AR device 102, reallocate memory of the rendering device, and reduce the data rate of transmission from the rendering device to the AR device 102.

In particular embodiments, the rendering engine 204 of the rendering device 220 may execute instructions to, based on the properties of the plurality of surfaces and the network 104 conditions, determine that 3D surfaces are higher priority than 2D surfaces, and as a result, transmit the 3D surfaces in a first subset of surfaces to the AR headset, with 2D surfaces being transmitted in a subsequent subset. Further, the rendering device 220 may translate 3D surfaces into 2D surfaces in response to the wireless conditions. In particular embodiments, one or more surfaces that need to be updated first may be given higher priority. In particular embodiments, surfaces intended to be world-locked may be determined to be a higher priority for transmission than head-locked surfaces.

In particular embodiments, the rendering engine 204 of the rendering device 220 may execute instructions to, based on the properties of the plurality of surfaces and the network 104 conditions, perform rate control, wherein the rendering transmits the surface data at a reduced bit rate, thereby reducing the data rate.

In particular embodiments, the rendering engine 204 of the rendering device 220 may execute instructions to, based on the properties of the plurality of surfaces and the network 104 conditions, perform multiple interval surface transfer. In particular embodiments, the rendering device 220 may transfer a single surface, or a plurality of single surfaces in multiple intervals. To do this, the rendering device 220 may adapt the frames per second to the available wireless bandwidth given current levels of wireless channel utilization and transmit a single surface over multiple wireless intervals. In particular embodiments, surfaces within the same subset may be distributed into multiple system intervals to reduce the occurrence of consecutive frame drop, which impacts user experience.

In particular embodiments, the rendering engine 204 of the rendering device 220 may execute instructions to, based on the properties of the plurality of surfaces and the network 104 conditions, perform content aware wireless scheduling and fencing. In particular embodiments, the rendering device 220 may rotate the scheduling of one or more surfaces within the same subset to avoid the frame rates of one surface being consistently dropped. Further, in particular embodiments, the rendering device 220 may perform deficit-based dynamic thermal fencing, in which the active duty cycle time may be adjusted so that either both left and right eye surfaces may be concurrently transmitted or neither will be transmitted. If the rendering device 220 determines that dropping, for example, four frames will cause judder, the rendering device may determine and execute a temporary solution, wherein one or two out of the four frames with extended transmission times will be transmitted to the AR device 102, while skipping the remaining two or three frames.

In particular embodiments, the rendering engine 204 of the rendering device 220 may execute instructions to, based on the properties of the plurality of surfaces and the network 104 conditions, reduce content. Reducing content may include transmitting, from the rendering device 220, less surfaces, or, less objects within a surface for display at the AR device 102. Similarly, in response to a determination of the network 104 condition by the rendering device 220, the rendering engine 204 of the rendering device 220 may execute instructions to reduce the field of view (FoV), wherein a reduced number of pixels may be transmitted to the AR device 102 for display. In particular embodiment, the rendering engine 204 of the rendering device 220 may execute instructions to, based on the properties of the plurality of surfaces and the network 104 conditions, reduce content frames per second (FPS). For example, and not by way of limitation, a surface with 45 FPS may be reduced to 30 FPS with a system interval change (or 22.5 without a system interval change). In particular embodiments, the technique of reducing content FPS may improve the perceivability of world-locked surfaces in an environment with judder.

In particular embodiments, the rendering engine 204 of the rendering device 220 may execute instructions to, based on the properties of the plurality of surfaces and the network 104 conditions, perform dimensionality adjustment. For example, in response to a determination of the network 104 condition by the rendering device, the rendering device may compress 3D surfaces into 2D surfaces, which may display the same surfaces, but with about $1/10^{th}$ the compression size as compared to the original 3D surface.

In particular embodiments, the rendering engine 204 of the rendering device 220 may execute instructions to, based on the properties of the plurality of surfaces and the network 104 conditions, divide a surface into multiple surfaces. The rendering engine 204 of the rendering device 220 may determine to divide a surface with multiple wireless packets into multiple surfaces. Further, in particular embodiments, the rendering engine 204 of the rendering device 220 may execute instructions to, based on the properties of the plurality of surfaces and the network 104 conditions, transmit one or more surfaces into encoding friendly material. The rendering device 220 may transmit one or more of the plurality of surfaces with, for example, more use of solid color, a gradient color schema, and/or low-resolution texture for display at the AR device 102.

In particular embodiments, at least one rendering parameter in the set of rendering parameters may be determined based on the characteristic (e.g., focal surface, 2D vs. 3D object dimensions, resolution, and so forth) associated with each individual surface to be rendered and displayed. For example, in particular embodiments, the centralized content and resource manager 232 may generate the set of rendering parameters by generating one or more of an altered frame rate (e.g., as expressed in frames per second (FPS)), an altered resolution, and altered 2D vs. 3D object dimensions.

In particular embodiments, the centralized content and resource manager 232 may then cause the one or more surfaces to be rendered by the rendering engine 234 in accordance with the set of rending parameters so as to satisfy the network 104 constraints. It should be appreciated that same would apply if the content was rendered on the rendering device 220, managers 206 and 208 may set rendering parameters and the rendering engine 234 may render accordingly. In particular embodiments, the rendering engine 234 may then output the rendered surfaces to the 3D re-projection warping functional block 236. The rendered surfaces may be then passed from the 3D re-projection warping functional block 236 to the latest IMU functional block 242 to associate the rendered surfaces with the latest user head pose data and object pose data, and re-project and display the surfaces 246 on the one or more displays of the AR device 102.

In particular embodiments, in accordance with the mentioned resilient rendering techniques, the centralized content and resource manager 232 may further receive a request to render one or more surfaces that may correspond, for example, to applications 212. In particular embodiments, the centralized content and resource manager 232 may then determine performance capacity at which an application 212 can execute within the current wireless constraints. In other embodiments, the centralized content and resource manager 232 may generate a prediction of workload requirements and select one or more parameters that will not violate the current wireless limits for the duration of the workload. In this embodiment, the centralized content and resource manager 232 ensures that the system is able to maximize performance while providing a user with stable level of performance and quality. The centralized content and resource manager 232 may generate this prediction when a user starts an application 212. In some embodiments, the prediction of workload requirements can be based on prior application history or other (user/app/system) contextual information.

In particular embodiments, the centralized content and resource manager 232 may then generate a prediction of a duration for rendering the one or more surfaces based on a current rendering workload of the AR device 102 and current wireless conditions. For example, in one embodiment, the centralized content and resource manager 232 may generate the prediction of a duration for rendering the one or more surfaces based on one or more parameters or instructions that may be associated with the particular applications 212. In another embodiment, the centralized content and resource manager 232 may utilize one or more machine-learning algorithms to learn or determine heuristically over time the duration in which one or more surfaces associated with particular applications 212 may be rendered with as best as possible quality of service ("QoS") in view of the current wireless network capacity. In another embodiment, the centralized content and resource manager 232 may generate the prediction of the duration for rendering the one or more surfaces based on a user context or an amount of user interaction that may be associated with a particular application (e.g., single-player gaming application, multi-player gaming application).

In particular embodiments, the centralized content and resource manager 232 may then select one of a plurality of predetermined rendering parameters based on the prediction of the duration for rendering the one or more surfaces. For example, in particular embodiments, the plurality of rendering parameters may include a high-performance rendering mode, a medium performance rendering mode, and a low performance rendering mode. For example, in some embodiments, the centralized content and resource manager 232 may map the predicted rendering workload to the determined wireless network conditions to render the one or more surfaces with as best as possible quality of service (QoS) and in view of the current wireless network constraints. In particular embodiments, the centralized content and resource manager 232 may then cause the rendering engine 234 of the AR device 102 or rendering engine 204 of the rendering device 220 to render the surface in accordance with the selected one of the plurality of predetermined rendering modes so as to satisfy the one or more wireless network restraints. For example, one or more 2D surfaces corresponding to, for example, an application with a shorter predicted duration (e.g., runtime of only a few minutes) may be rendered in accordance with the high-performance rendering mode. In contrast, one or more 3D surfaces corresponding to, for example, a gaming application (e.g., which may also include considerable user interaction) with a longer predicted duration (e.g., runtime of 30 minutes or more or a runtime of 1 hour or more) may be rendered in accordance with the low performance rendering mode. For example, in good wireless conditions, the rendering device 102 may execute instructions to render all 3D surfaces in high resolution, but in poor wireless conditions, the rendering device 102 may execute instructions to render less surfaces and render those surfaces in 2D, with low resolution.

In particular embodiments, in accordance with the foregoing rendering techniques, the centralized content and resource manager 232 may further receive a request to render one or more surfaces that may correspond, for example, to applications 212. In particular embodiments, as previously noted above the AR device 102 may receive requests or other data from the rendering device 220 over a network 104. In particular embodiments, the AR device 102 may include one or more first processors (e.g., one or more first graphic processing units (GPUs)) for driving the rendering engine 234, and, similarly, the rendering device 220 may include one or more second processors (e.g., one or more second GPUs) for driving the rendering engine 204. For example, in particular embodiments, the AR device 102 and the rendering device 220 may be suitable for supporting, for example, distributed graphics pipeline (e.g., the one or more first GPUs of the AR device 102 and the one or more second GPUs of the rendering device 220 transferring data over the network 104). Thus, in one example embodiment, one or more surfaces may be rendered either utilizing the rendering engine 234 and associated first one or more GPUs of the AR device 102 or utilizing the rendering engine 204 and associated second one or more GPUs of the rendering device 220.

In particular embodiments, the first one or more GPUs of the AR device 102 may include less processing power or support a subset of rendering features/capabilities as compared to the second one or more GPUs of the rendering device 220. In particular embodiments, the centralized content and resource manager 232 may determine a rendering workload associated with rendering the one or more surfaces to satisfy one or more network 104 constraints associated with the AR device 102 and a target QoS with respect to the network 104 communicatively coupling the rendering device 220 and the AR device 102. In particular embodiments, the centralized content and resource manager 232 may then dynamically switch between rendering the one or more surfaces utilizing the rendering engine 234 and associated one or more first GPUs of the AR device 102 and rendering the one or more surfaces utilizing the rendering engine 204 and associated one or more second GPUs of the rendering device 220 based on the one or more power, processing, or thermal constraints and the target QoS.

Thus, in accordance with the foregoing embodiments, the present techniques may provide various rendering techniques that may be utilized by a device for dynamically rendering surfaces in varying network 104 conditions. For example, the present techniques may be provided to alter parameters of the rendering workload of the device and to determine when, and the manner in which, to alter parameters of the rendering workload of the device in accordance with predetermined network 104 constraints.

Figure 3:
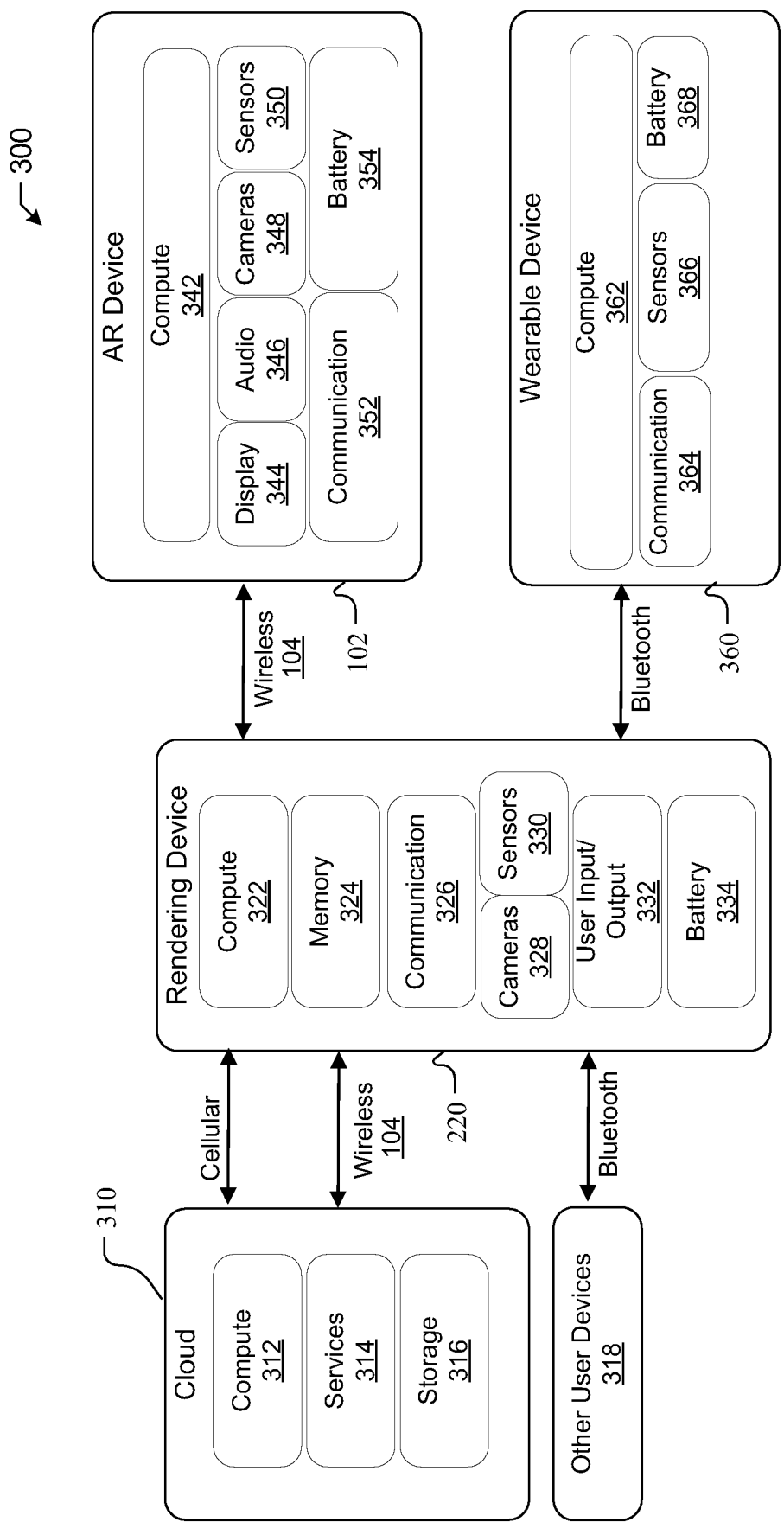
FIG. 3 illustrates a diagram of a method for providing rendering techniques.

FIG. 3 illustrates a detailed embodiment of an augmented-reality (AR) system 300 for providing various resilient rendering techniques that may be utilized by a rendering device for rendering surfaces in a variety of network 104 conditions. As depicted, AR system 300 may consist of a cloud system 310, rendering device 220, AR device 102, and wearable device 360. In particular embodiments, the cloud architecture 310 may include computing components 312, cloud-based service components 314, and cloud-based storage 316. In particular embodiments, the cloud computing components 312 may generate frames corresponding to a plurality of surfaces and access one or more depth maps corresponding to the frames of each of the plurality of surfaces. In particular embodiments, the cloud computing components 312 may also maintain and keep track of pose information (e.g., head pose data, object pose data) of one or more objects within the frames calculated by the head pose tracking functional block 202 and pose data received from the AR device 102. Cloud-based service components 314 may host and service applications 212, which may include, for example, AR experiences executing on the AR device 102. For example, in particular embodiments, applications 212 within the cloud-based service component 314 may include AR applications such as video gaming applications (e.g., single-player games, multi-player games, first-person point of view (POV) games), mapping applications, music playback applications, video-sharing platform applications, video-streaming applications, e-commerce applications, social media applications, user interface (UI) applications, or other AR applications users may experience. In particular embodiments, cloud-based storage 316 may contain instructions from an internal register, internal cache, or memory. Cloud-based storage 316 may include mass storage for data or instructions. Cloud-based storage 316 may reside in a cloud, which may include one or more cloud components in one or more networks 104.

Cloud system 310 may transmit data to rendering device 220 via a cellular telephone network (such as, for example, a Global System for Mobile Communications (GSM) network or network 104, such as a WI-FI network. As depicted, other user devices 318 may transmit data to rendering device 220 via a Bluetooth WPAN. Other user devices 318 may include, and are not limited to a HMD connected to a host computer system, a standalone HMD, a mobile device or computing system, or any other hardware platform capable of providing augmented-reality content.

In particular embodiments, rendering device 220 may include a computing device 322, memory 324, communication component 326, one or more camera(s) 328, one or more sensor(s) 330, a user input/output module 332, and one or more batteries 334. Computing device 322 may receive or request data over a network 104 or cellular network from cloud system 310. In particular embodiments, computing device 322 may receive or request data over a network 104 from AR device 102. In particular embodiments, computing device 322 may receive or request data over a BLU-ETOOTH WPAN from wearable device 360. In particular embodiments, the computing device 322 of rendering device 220 may include one or more first processors (e.g., one or more first graphics processing units (GPUs)) for driving the rendering engine 204 of rendering device 220, as displayed in FIG. 2. Similarly, the computing device 322 may include one or more second processors (e.g., one or more second GPUs) for driving rendering engine 234 of the AR device 102, as displayed in FIG. 2. In particular embodiments, the computing device 322 of rendering device 220 and the computing device 342 of the AR device 102 may be suitable for supporting a distributed graphics pipeline, wherein the one or more GPUs of computing device 322 and the one or more GPUs of computing device 342 may transfer data over the network 104.

In particular embodiments, computing device 322 may generate surfaces corresponding to a sequence of image frames. In particular embodiments, the computing device 322 may also access one or more depth maps corresponding to the surfaces. In particular embodiments, as further depicted, the computing device 322 may maintain and keep track of pose information pose information (e.g., head pose data, object pose data) of one or more objects within the frames calculated by the head pose tracking functional block 202 and pose data received from the AR device 102. Computing device 322 may host and service applications 212, which may include, for example, AR experiences executing on the AR device 102.

The one or more processors of computing device 322 and computing device 342 may include hardware for executing instructions, such as those making up a computer program. As an example, and not by way of limitation, to execute instructions, one or more processors of computing device 322 and computing device 342 may retrieve or fetch the instructions from an internal register, internal cache, memory 324, or storage. In particular embodiments, computing device 322 may perform the functions of the head pose tracking functional block 202, rendering engine 204, 3D re-projection warping functional block 206, resource manager 208, content manager 210, and applications 212. In particular embodiments, the computing device 322 of rendering device 220 may generate surfaces corresponding to a sequence of image frames via rendering engine 204. In particular embodiments, computing device 322 of rendering device 220 may access one or more depth maps corresponding to the surfaces. In particular embodiments, computing device 322 may also maintain and keep track of pose information (e.g., head pose data, object pose data) of one or more surfaces calculated by the head pose functional block 202 and pose data received from computing device 342 of AR device 102.

In particular embodiments, the computing device 322 may host and service applications 212, which may include, for example, AR experiences executing on the AR device 102. For example, in particular embodiments, the applications 212 may include, for example, AR applications, such as video gaming applications (e.g., single-player games, multi-player games, first-person point of view (POV) games), mapping applications, music playback applications, video-sharing platform applications, video-streaming applications, e-commerce applications, social media applications, user interface (UI) applications, or other AR applications users 102 may experience. In particular embodiments, applications 212 or other AR content may be analyzed and managed by way of the content manager 210 executing on computing device 322. For example, in particular embodiments, the content manager 210 may include, for example, any system (e.g., software system, frameworks, compositors, or other forms of middleware/runtime systems that manage scenes displayed by the AR device 102) that may be utilized to analyze and manage 3D content associated with the applications 212 to be rendered and displayed by the AR device 102. Similarly, the resource manager 208 may include, for example, any system (e.g., software system) that keeps track of the available hardware and/or software components for hosting and servicing the applications 212 or other AR content.

In particular embodiments, computing device 322 of rendering device 220 may render surfaces corresponding to the applications 212 or other AR content utilizing the rendering engine 204. In particular embodiments, the rendering engine 204 may then output the rendered surfaces to the 3D re-projection warping functional block 206, which may be utilized to compensate for network 104 latency for the viewpoint change in that the rendered frames are provided over the network 104 to computing device 342 of AR device 102. In particular embodiments, as further depicted, the rendered and warped frames may be then passed from the 3D re-projection warping functional block 206 over the network 104 to a latest IMU functional block 242 of computing device 342 of the AR device 102. In particular embodiments, the latest IMU functional block 242 may be utilized to associate the rendered surfaces with the latest user head pose data and object pose data (e.g., real-time or near real-time head pose data and/or object pose data), for example, and re-project and display the surfaces 246 on the one or more displays of the AR device 102 to be interacted with by a user of the AR device 102.

In particular embodiments, as previously discussed above, computing device 322 of rendering device 220 may have to reduce the resolution of one or more surfaces, prioritize surfaces, transmit surfaces at lower bit rates, transmit the surfaces in multiple intervals, reduce the number of surfaces, reduce the FoV, reduce FPS, and so on.

In particular embodiments, the computing device 342 of AR device 102 may include a centralized content and resource manager 232 (e.g., content and scene manager) that may be utilized to perform various resilient rendering techniques for mitigating frame drops. It should be appreciated that while the centralized content and resource manager 232 is displayed as being implemented on the AR device 102, in some embodiments, the centralized content and resource manager 232 can either reside on the rendering device 220 or the AR device 102, or be split and shared between the rendering device 220 and the AR device 102. For example, in some embodiments, the centralized content and resource manager 232 can be implemented in a software module as part of framework or be distributed between software and firmware modules. In some embodiments, the present resilient rendering techniques may be performed by the centralized content and resource manager 232 of the AR device 102 and post-rendering with respect to the rendering device 220 (e.g., after surfaces are generated and rendered by the rendering engine 204 of the rendering device 220 and provided to the AR device 102). In other embodiments, the present resilient rendering techniques may be performed by the centralized content and resource manager 232 while a rendering and displaying of one or more surfaces is already in-progress (e.g., in real-time or near real-time). Still, in other embodiments, the present resilient rendering techniques may be orchestrated solely by the centralized content and resource manager 232 of the AR device 102 and performed by the rendering engine 234 of the AR device 102 or by the rendering engine 204 of the rendering device 220.

In particular embodiments, computing device 322 may monitor the condition of the network 104 (e.g., network 104 latency, network 104 quality, network 104 bandwidth, network 104 data throughput, and so forth) with respect to the determined rendering workload associated with rendering one or more surfaces. For example, in some embodiments, the one or more surfaces may include AR content that may be latency sensitive (e.g., world-locked AR content may be constantly updated as the user's head pose changes). In accordance with the presently disclosed embodiments, computing device 322 may thus analyze the AR content of the one or more surfaces, and, based on the condition of the network 104 and the determined rendering workload associated with rendering the one or more surfaces, render the one or more surfaces utilizing the rendering engine 204 and associated one or more first GPUs of the computing device 322.

For example, in particular embodiments, the computing device 322 of rendering device 220 may provide, to the centralized content and resource manager 232, a request for surfaces associated with one or more applications 212 to be rendered and displayed by the AR device 102, and computing device 322 may then determine the manner in which to render and display the requested surfaces. The computing device 322 may then carry out the rendering and displaying of the requested surfaces by instructing and utilizing the rendering engine 204 and 3D re-projection warp functional block 206. In one example embodiment, computing device 322 may include, for example, any system (e.g., software system) that may be utilized to analyze, process, and manage surfaces of AR content to be rendered and displayed by the AR device 102. In another example embodiment, computing device 322 may include, for example, any system (e.g., software system) that maintains and keeps track of the available hardware resources and/or software resources (e.g., power budgets, thermal budgets, camera data 238, sensor data 240, processing capacity, memory capacity, power consumption, processing time, network 104 bandwidth, network 104 latency, network 104 data throughput, network 104 quality, and so forth) to be utilized for rendering and displaying surfaces of AR content on the AR device 102.

In particular embodiments, in accordance with the presently disclosed techniques, computing device 322 may receive a request to render one or more surfaces from cloud computing component 312 of cloud system 310, computing device 342 of AR device 102, and/or computing device 362 of wearable device 360.

In particular embodiments, computing device 322 may determine associated image characteristics with respect to each object of the content of the one or more surfaces. For example, in particular embodiments, computing device 322 may determine with respect to each object of the content of the one or more surfaces, a foveal region (e.g., based on camera data 238 and/or camera data 348), an object dimension (e.g., computing device 322 may determine and distinguish 3D objects and content from 2D objects and content), a viewing distance (e.g., distance away from the viewer), user interaction (e.g., a game may involve the user interacting with only certain objects while avoiding other objects), and so forth.

In particular embodiments, computing device 322 may then determine whether to reduce a rendering workload associated with rendering the one or more surfaces to satisfy one or more network 104 constraints. It is understood that computing device 342 of AR device 102 may perform all of the same functions as computing device 322 of the rendering device 220.

In particular embodiments, computing device 322 may generate a set of rending parameters for rendering the one or more surfaces in response to a determination of network 104 quality. Rendering parameters may consist of one or more rendering techniques, as previously discussed. For example, and not by way of limitation, computing device 322 may generate a plurality of sets of rendering modes consisting of one or more rendering parameters. Rendering modes may be generated based on, for example, rendering parameters with a high user experience impact (e.g., reducing the amount of surfaces displayed to the user), rendering parameters with medium/high user experience impact (e.g., prioritizing surfaces that need to be updated first), rendering parameters with medium/low user experience impact (e.g., transmitting a single surface over multiple wireless intervals), and rendering parameters with low user experience impact (e.g., color characteristics, gradient color schema, etc.). In particular embodiments, rendering modes may be generated based on rendering parameters with varying degrees of bandwidth reduction. In particular embodiments, rendering modes may be generated based the impact of the power supply to the AR device 102 and/or the location of where each rendering parameter may execute (e.g., GPU or wireless).

In particular embodiments, computing device 322 of the rendering device 220 may execute instructions to, based on the properties of the plurality of surfaces and the network 104 conditions, divide the plurality of surfaces into subsets, and based on the properties of each subset, apply one or more resilient rendering techniques and/or rendering modes, and further prioritize one or more first subsets over one or more second subsets for transmission to AR device 102.

In particular embodiments, computing device 322 of the rendering device 220 may execute instructions to, based on the properties of the plurality of surfaces and the network 104 conditions, adjust the image quality, or resolution, of one or more individual surfaces. The rendering device 220 may determine that the quality and resolution of the one or more surfaces needs to be reduced based on a determination of poor network 104 conditions. In particular embodiments, computing device 322 may perform the actions of resetting the streaming of image data from the rendering device 220 to the AR device 102, reallocate memory 324 of the rendering device 220, and reduce the data rate of transmission from the rendering device 220 to the AR device 102.

In particular embodiments, computing device 322 of the rendering device 220 may execute instructions to, based on the properties of the plurality of surfaces and the network 104 conditions, determine that 3D surfaces are higher priority than 2D surfaces, and as a result, transmit the 3D surfaces in a first subset of surfaces to the AR device 102, with 2D surfaces being transmitted in a subsequent subset. Further, computing device 322 may translate 3D surfaces into 2D surfaces in response to the network 104 conditions. In particular embodiments, one or more surfaces that need to be updated first may be given higher priority. In particular embodiments, surfaces intended to be world-locked may be determined to be a higher priority for transmission than head-locked surfaces.

In particular embodiments, computing device 322 of the rendering device 220 may execute instructions to, based on the properties of the plurality of surfaces and the network 104 conditions, perform rate control, wherein the rendering transmits the surface data at a reduced bit rate, thereby reducing the data rate. In particular embodiments, computing device 322 of the rendering device 220 may execute instructions to, based on the properties of the plurality of surfaces and the network 104 conditions, perform multiple interval surface transfer. In particular embodiments, computing device 322 may transfer a single surface, or a plurality of single surfaces in multiple intervals. To do this, computing device 322 may adapt the frames per second to the available wireless bandwidth given current levels of wireless channel utilization and transmit a single surface over multiple wireless intervals. In particular embodiments, surfaces within the same subset may be distributed into multiple system intervals to reduce the occurrence of consecutive frame drop, which impacts user experience.

In particular embodiments, computing device 322 of rendering device 220 may execute instructions to, based on the properties of the plurality of surfaces and the network 104 conditions, perform content aware wireless scheduling and fencing. In particular embodiments, computing device 322 may rotate the scheduling of one or more surfaces within the same subset to avoid the frame rates of one surface being consistently dropped. Further, in particular embodiments, computing device 322 may perform deficit-based dynamic thermal fencing, in which the active duty cycle time may be adjusted so that either both left and right eye surfaces may be concurrently transmitted or neither will be transmitted. If computing device 322 determines that dropping, for example, four frames will cause judder, computing device 220 may determine and execute a temporary solution, wherein one or two out of the four frames with extended transmission times will be transmitted to the AR device 102, while skipping the remaining two or three frames.

In particular embodiments, computing device 322 of rendering device 220 may execute instructions to, based on the properties of the plurality of surfaces and the network 104 conditions, reduce content. Reducing content may include transmitting, from computing device 322, less surfaces, or, less objects within a surface for display at the AR device 102. Similarly, in response to a determination of the network 104 condition by computing device 322, the rendering engine 204 of the computing device 322 may execute instructions to reduce the field of view (FoV), wherein a reduced number of pixels may be transmitted to the AR device 102 for display. In particular embodiment, computing device 322 of rendering device 220 may execute instructions to, based on the properties of the plurality of surfaces and the network 104 conditions, reduce content frames per second (FPS). For example, and not by way of limitation, a surface with 45 FPS may be reduced to 30 FPS with a system interval change (or 22.5 without a system interval change). In particular embodiments, the technique of reducing content FPS may improve the perceivability of world-locked surfaces in an environment with judder.

In particular embodiments, computing device 322 of rendering device 220 may execute instructions to, based on the properties of the plurality of surfaces and the network 104 conditions, perform dimensionality adjustment. For example, in response to a determination of the network 104 condition by computing device 322, computing device 322 may compress 3D surfaces into 2D surfaces, which may display the same surfaces, but with about $\frac{1}{10}^{th}$ the compression size as compared to the original 3D surface.

In particular embodiments, computing device 322 of rendering device 220 may execute instructions to, based on the properties of the plurality of surfaces and the network 104 conditions, divide a surface into multiple surfaces. The computing device 322 of rendering device 220 may determine to divide a surface with multiple wireless packets into multiple surfaces. Further, in particular embodiments, computing device 322 of the rendering device 220 may execute instructions to, based on the properties of the plurality of surfaces and the network 104 conditions, transmit one or more surfaces into encoding friendly material. The computing device 322 of rendering device 220 may transmit one or more of the plurality of surfaces with, for example, more use of solid color, a gradient color schema, and/or low-resolution texture for display at the AR device 102.

In particular embodiments, at least one rendering parameter in the set of rendering parameters may be determined based on the characteristic (e.g., focal surface, 2D vs. 3D object dimensions, resolution, and so forth) associated with each individual surface to be rendered and displayed. For example, in particular embodiments, computing device 322 may generate the set of rendering parameters by generating one or more of an altered frame rate (e.g., as expressed in frames per second (FPS)), an altered resolution, and altered 2D vs. 3D object dimensions.

In particular embodiments, computing device 322 may then generate a prediction of a duration for rendering the one or more surfaces based on a current rendering workload of the AR device 102 and current network 104 conditions. For example, in one embodiment, computing device 322 may generate a prediction of a duration for rendering the one or more surfaces based on one or more parameters or instructions that may be associated with the particular applications 212. In another embodiment, computing device 322 may utilize one or more machine-learning algorithms to learn or determine heuristically over time the duration in which one or more surfaces associated with particular applications 212 may be rendered with as best as possible quality of service ("QoS") in view of the current network 104 capacity. In another embodiment, the computing device 322 may generate the prediction of the duration for rendering the one or more surfaces based on a user context or an amount of user interaction that may be associated with a particular application (e.g., single-player gaming application, multi-player gaming application).

In particular embodiments, computing device 322 may select one of a plurality of predetermined rendering parameters based on the prediction of the duration for rendering the one or more surfaces. For example, as previously discussed, in particular embodiments, the plurality of rendering parameters may include a high-performance rendering mode, a medium performance rendering mode, and a low performance rendering mode. For example, in some embodiments, computing device 322 may map the predicted rendering workload to the determined network 104 conditions to render the one or more surfaces with as best as possible quality of service (QoS) and in view of the current network 104 constraints. In particular embodiments, computing device 322 may then cause the rendering engine 234 of the AR device 102 or rendering engine 204 of the rendering device 220 to render the surface in accordance with the selected one of the plurality of predetermined rendering modes so as to satisfy the one or more network 104 restraints. For example, one or more 2D surfaces corresponding to, for example, an application with a shorter predicted duration (e.g., runtime of only a few minutes) may be rendered in accordance with the high-performance rendering mode. In contrast, one or more 3D surfaces corresponding to, for example, a gaming application (e.g., which may also include considerable user interaction) with a longer predicted duration (e.g., runtime of 30 minutes or more or a runtime of 1 hour or more) may be rendered in accordance with the low performance rendering mode. For example, in good network 104 conditions, computing device 322 may execute instructions to render all 3D surfaces in high resolution, but in poor network 104 conditions, computing device 322 may execute instructions to render less surfaces and render those surfaces in 2D, with low resolution.

In particular embodiments, the computing device 342 of the AR device 102 may include less processing power or support a subset of rendering features/capabilities as compared to the second one or more GPUs of computing device 322. In particular embodiments, computing device 322 may determine a rendering workload associated with rendering the one or more surfaces to satisfy one or more network 104 constraints associated with the AR device 102 and a target QoS with respect to the network 104 communicatively coupling the rendering device 220 and the AR device 102. In particular embodiments, computing device 322 may then dynamically switch between rendering the one or more surfaces utilizing the computing device 342 of AR device 102 and rendering the one or more surfaces utilizing the computing device 322 of rendering device 220 based on the one or more power, processing, or thermal constraints and the target QoS.

Thus, in accordance with the foregoing embodiments, the present techniques may provide various rendering techniques that may be utilized by a device for dynamically rendering surfaces in varying network 104 conditions. For example, the present techniques may be provided to alter parameters of the rendering workload of the rendering device 220 and to determine when, and the manner in which, to alter parameters of the rendering workload of the device in accordance with predetermined network 104 constraints.

In particular embodiments, rendering device 220 includes memory 324. Data in the data caches may be copies of data in memory 324 or storage for instructions executing at one or more processors of computing device 322 to operate on, the results of previous instructions executed at computing device 322 for access by subsequent instructions executing at the computing device 322 or for writing to memory 324. The data caches may speed up read or write operations by the computing device 322. The TLBs may speed up virtual-address translation for computing device 322. In particular embodiments, computing device 322 may include one or more internal registers for data, instructions or addresses. In this disclosure, the one or more processors of computing device 322 may include any suitable number of internal registers. Where appropriate, computing device 322 may include one or more arithmetic logic units (ALUs); be a multi-core processor, or include one or more processors. It is understood that this disclosure contemplates any suitable processor.

In particular embodiments, memory 324 includes main memory for storing instructions for computing device 322 to execute or operate on. As an example, and not by way of limitation, rendering device 220 may load instructions from storage to memory 324. The computing system 322 may then load instructions from memory 324 to an internal register or internal cache. To execute the instructions, computing device 322 may retrieve the instructions from the internal register or internal cache and decode them. During or after execution of the instructions, computing device 322 may write one or more results (which may be intermediate or final results) to the internal register or internal cache. Computing device 322 may then write one or more of those results to memory 324. In particular embodiments, computing device 322 executes only instructions in one or more internal registers or internal caches or in memory 324 and operates only on data in one or more internal registers or internal caches or in memory 324.

One or more memory buses (which may each include an address bus and a data bus) may couple computing device 322 to memory 324. In particular embodiments, memory 324 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 324 may include one or more memories, where appropriate.

Communication module 326 may enable communication between the cloud system 310, other user devices 318, AR device 102, wearable device 360, and the modules of rendering device 220. As an example, and not by way of limitation, communication module 326 may include a network interface controller (NIC) or network adaptor for communicating with an Ethernet or other wire-based network of a wireless NIC (WNIC) or wireless adapter for communication with network 104. It is understood that computing device 342 of AR device 102 may perform all of the same functions as computing device 322 of the rendering device 220.

Rendering device 220 may include one or more cameras 328 which may capture images and videos of environments. In particular embodiments, rendering device 220 may include one or more sensors 330 such as accelerometers, gyroscopes, magnetometers, and touch sensors to generate sensor data 240 that tracks the location of rendering device 220 and AR device 102. AR device 102 may use sensors 330 of rendering device 220, to determine velocity, orientation, and gravitation forces with respect to the AR device 102. In particular embodiments, rendering device 220 may include a user input/output (I/O) module 332 including hardware, software, or both, for providing one or more interfaces for communication between cloud system 310, rendering device 220, AR device 102, and wearable device 360. Further, I/O module 332 may enable communications between other user devices 318 and rendering device 220. In particular embodiments, rendering device 220 may include one or more batteries 334.

In particular embodiments, AR device 102 may include computing device 342, display 344, audio 346, one or more camera(s) 348, one or more sensor(s) 350, a communication module 352, and one or more batteries 354. In particular embodiments, computing device 342 may perform functionalities of centralized content and resource manager 232, rendering engine 234, and the 3D Re-projection warping functional block 236. AR device 102

In particular embodiments, computing device 342 may determine associated image characteristics with respect to each object of the content of the one or more surfaces. For example, in particular embodiments, computing device 342 may determine with respect to each object of the content of the one or more surfaces, a foveal region (e.g., based on camera data 328 and/or camera data 348), an object dimension (e.g., computing device 342 may determine and distinguish 3D objects and content from 2D objects and content), a viewing distance (e.g., distance away from the viewer), user interaction (e.g., a game may involve the user interacting with only certain objects while avoiding other objects), and so forth. In particular embodiments, computing device 342 may then determine whether to reduce a rendering workload associated with rendering the one or more surfaces to satisfy one or more network 104 constraints.

In particular embodiments, computing device 342 may generate a set of rending parameters for rendering the one or more surfaces in response to a determination of network 104 quality. Rendering parameters may consist of one or more rendering techniques, as previously discussed. For example, and not by way of limitation, computing device 342 may generate a plurality of sets of rendering modes consisting of one or more rendering parameters. Rendering modes may be generated based on, for example, rendering parameters with a high user experience impact (e.g., reducing the amount of surfaces displayed to the user), rendering parameters with medium/high user experience impact (e.g., prioritizing surfaces that need to be updated first), rendering parameters with medium/low user experience impact (e.g., transmitting a single surface over multiple wireless intervals), and rendering parameters with low user experience impact (e.g., color characteristics, gradient color schema, etc.). In particular embodiments, rendering modes may be generated based on rendering parameters with varying degrees of bandwidth reduction. In particular embodiments, rendering modes may be generated based the impact of the power supply to the AR device 102 and/or the location of where each rendering parameter may execute (e.g., GPU or wireless).

In particular embodiments, computing device 342 of AR device 102 may execute instructions to, based on the properties of the plurality of surfaces and the network 104 conditions, divide the plurality of surfaces into subsets, and based on the properties of each subset, apply one or more resilient rendering techniques and/or rendering modes, and further prioritize one or more first subsets over one or more second subsets for display at AR device 102.

In particular embodiments, computing device 342 of AR device 102 may execute instructions to, based on the properties of the plurality of surfaces and the network 104 conditions, adjust the image quality, or resolution, of one or more individual surfaces. AR device 102 may determine that the quality and resolution of the one or more surfaces needs to be reduced based on a determination of poor network 104 conditions. In particular embodiments, computing device 342 may perform the actions of resetting the streaming of image data from the rendering device 220 to the AR device 102, reallocate memory 324 of the rendering device 220, and reduce the data rate of transmission from the rendering device 220 to the AR device 102.

In particular embodiments, computing device 342 of AR device 102 may execute instructions to, based on the properties of the plurality of surfaces and the network 104 conditions, determine that 3D surfaces are higher priority than 2D surfaces, and as a result, render the 3D surfaces in a first subset of surfaces at the AR device 102, with 2D surfaces being rendered in a subsequent subset. In particular embodiments, one or more surfaces that need to be updated first may be given higher priority. In particular embodiments, surfaces intended to be world-locked may be determined to be a higher priority for transmission than head-locked surfaces.

In particular embodiments, computing device 342 of AR device 102 may execute instructions to, based on the properties of the plurality of surfaces and the network 104 conditions, perform rate control, wherein the rendering device 220 transmits the surface data at a reduced bit rate, thereby reducing the data rate. In particular embodiments, computing device 342 of AR device 102 may execute instructions to, based on the properties of the plurality of surfaces and the network 104 conditions, perform multiple interval surface transfer. In particular embodiments, computing device 342 may render a single surface, or a plurality of single surfaces in multiple intervals. To do this, computing device 342 may adapt the frames per second to the available wireless bandwidth given current levels of wireless channel utilization and transmit a single surface over multiple wireless intervals. In particular embodiments, surfaces within the same subset may be distributed into multiple system intervals to reduce the occurrence of consecutive frame drop, which impacts user experience.

In particular embodiments, computing device 342 of AR device 102 may execute instructions to, based on the properties of the plurality of surfaces and the network 104 conditions, perform content aware wireless scheduling and fencing. In particular embodiments, computing device 342 may rotate the scheduling of one or more surfaces within the same subset to avoid the frame rates of one surface being consistently dropped. Further, in particular embodiments, computing device 342 may perform deficit-based dynamic thermal fencing, in which the active duty cycle time may be adjusted so that either both left and right eye surfaces may be concurrently transmitted or neither will be transmitted. If computing device 342 determines that dropping, for example, four frames will cause judder, computing device 342 may determine and execute a temporary solution, wherein one or two out of the four frames with extended transmission times will be transmitted to the AR device 102, while skipping the remaining two or three frames.

In particular embodiments, computing device 342 of AR device 102 may execute instructions to, based on the properties of the plurality of surfaces and the network 104 conditions, reduce content. Reducing content may include transmitting, from computing device 342, less surfaces, or, less objects within a surface for display at AR device 102. Similarly, in response to a determination of the network 104 condition by computing device 342, the rendering engine 234 of the computing device 342 may execute instructions to reduce the field of view (FoV), wherein a reduced number of pixels may be transmitted to the AR device 102 for display. In particular embodiment, computing device 342 of AR device 102 may execute instructions to, based on the properties of the plurality of surfaces and the network 104 conditions, reduce content frames per second (FPS). For example, and not by way of limitation, a surface with 45 FPS may be reduced to 30 FPS with a system interval change (or 22.5 without a system interval change). In particular embodiments, the technique of reducing content FPS may improve the perceivability of world-locked surfaces in an environment with judder.

In particular embodiments, computing device 342 of AR device 102 may execute instructions to, based on the properties of the plurality of surfaces and the network 104 conditions, perform dimensionality adjustment. For example, in response to a determination of the network 104 condition by computing device 342, computing device 342 may compress 3D surfaces into 2D surfaces, which may display the same surfaces, but with about $\frac{1}{10}^{th}$ the compression size as compared to the original 3D surface.

In particular embodiments, computing device 342 of AR device 102 may execute instructions to, based on the properties of the plurality of surfaces and the network 104 conditions, divide a surface into multiple surfaces. The computing device 342 of AR device 102 may determine to divide a surface with multiple wireless packets into multiple surfaces. Further, in particular embodiments, computing device 342 of AR device 102 may execute instructions to, based on the properties of the plurality of surfaces and the network 104 conditions, transmit one or more surfaces into encoding friendly material. The computing device 342 of AR device 102 may transmit one or more of the plurality of surfaces with, for example, more use of solid color, a gradient color schema, and/or low-resolution texture for display at the AR device 102.

In particular embodiments, at least one rendering parameter in the set of rendering parameters may be determined based on the characteristic (e.g., focal surface, 2D vs. 3D object dimensions, resolution, and so forth) associated with each individual surface to be rendered and displayed. For example, in particular embodiments, computing device 342 may generate the set of rendering parameters by generating one or more of an altered frame rate (e.g., as expressed in frames per second (FPS)), an altered resolution, and altered 2D vs. 3D object dimensions.

In particular embodiments, computing device 342 may then generate a prediction of a duration for rendering the one or more surfaces based on a current rendering workload of the AR device 102 and current network 104 conditions. For example, in one embodiment, computing device 342 may generate a prediction of a duration for rendering the one or more surfaces based on one or more parameters or instructions that may be associated with the particular applications 212. In another embodiment, computing device 342 may utilize one or more machine-learning algorithms to learn or determine heuristically over time the duration in which one or more surfaces associated with particular applications 212 may be rendered with as best as possible quality of service ("QoS") in view of the current network 104 capacity. In another embodiment, the computing device 342 may generate the prediction of the duration for rendering the one or more surfaces based on a user context or an amount of user interaction that may be associated with a particular application (e.g., single-player gaming application, multi-player gaming application).

In particular embodiments, computing device 342 may select one of a plurality of predetermined rendering parameters based on the prediction of the duration for rendering the one or more surfaces. For example, as previously discussed, in particular embodiments, the plurality of rendering parameters may include a high-performance rendering mode, a medium performance rendering mode, and a low performance rendering mode. For example, in some embodiments, computing device 342 may map the predicted rendering workload to the determined network 104 conditions to render the one or more surfaces with as best as possible quality of service (QoS) and in view of the current network 104 constraints. In particular embodiments, computing device 342 may then cause the rendering engine 234 of the AR device 102 or rendering engine 204 of the rendering device 220 to render the surface in accordance with the selected one of the plurality of predetermined rendering modes so as to satisfy the one or more network 104 restraints. For example, one or more 2D surfaces corresponding to, for example, an application with a shorter predicted duration (e.g., runtime of only a few minutes) may be rendered in accordance with the high-performance rendering mode. In contrast, one or more 3D surfaces corresponding to, for example, a gaming application (e.g., which may also include considerable user interaction) with a longer predicted duration (e.g., runtime of 30 minutes or more or a runtime of 1 hour or more) may be rendered in accordance with the low performance rendering mode. For example, in good network 104 conditions, computing device 342 may execute instructions to render all 3D surfaces in high resolution, but in poor network 104 conditions, computing device 342 may execute instructions to render less surfaces and render those surfaces in 2D, with low resolution.

In particular embodiments, the computing device 342 of the AR device 102 may include less processing power or support a subset of rendering features/capabilities as compared to the second one or more GPUs of computing device 322. In particular embodiments, computing device 322 may determine a rendering workload associated with rendering the one or more surfaces to satisfy one or more network 104 constraints associated with the AR device 102 and a target QoS with respect to the network 104 communicatively coupling the rendering device 220 and the AR device 102. In particular embodiments, computing device 322 may then dynamically switch between rendering the one or more surfaces utilizing the computing device 342 of AR device 102 and rendering the one or more surfaces utilizing the computing device 322 of rendering device 220 based on the one or more power, processing, or thermal constraints and the target QoS.

Thus, in accordance with the foregoing embodiments, the present techniques may provide various rendering techniques that may be utilized by a device for dynamically rendering surfaces in varying network 104 conditions. For example, the present techniques may be provided to alter parameters of the rendering workload of the rendering device 220 and to determine when, and the manner in which, to alter parameters of the rendering workload of the device in accordance with predetermined network 104 constraints.

In particular embodiments, AR device 102 includes a display 344, audio 346, one or more camera(s) 348, one or more sensor(s) 350, a communication module 352, and one or more batteries 354. Communication module 356 may enable communication between the cloud system 310, other user devices 318, wearable device 360, and rendering device 220. As an example, and not by way of limitation, communication module 352 may include a network interface controller (NIC) or network adaptor for communicating with an Ethernet or other wire-based network of a wireless NIC (WNIC) or wireless adapter for communication with network 104.

AR device 102 may include one or more cameras 348 which may capture images and videos of environments. In particular embodiments, AR device 102 may include one or more sensors 350 such as accelerometers, gyroscopes, magnetometers, and touch sensors to generate sensor data 240 that tracks the location of rendering device 220 and AR device 102. AR device 102 may use sensors 330 of rendering device 220, to determine velocity, orientation, and gravitation forces with respect to the AR device 102. In particular embodiments, AR device 102 may include one or more batteries 354. In particular embodiments, wearable device 360 may include computing device 362, communication module 364, one or more sensor(s) 366, and one or more batteries 368.

Figure 4:
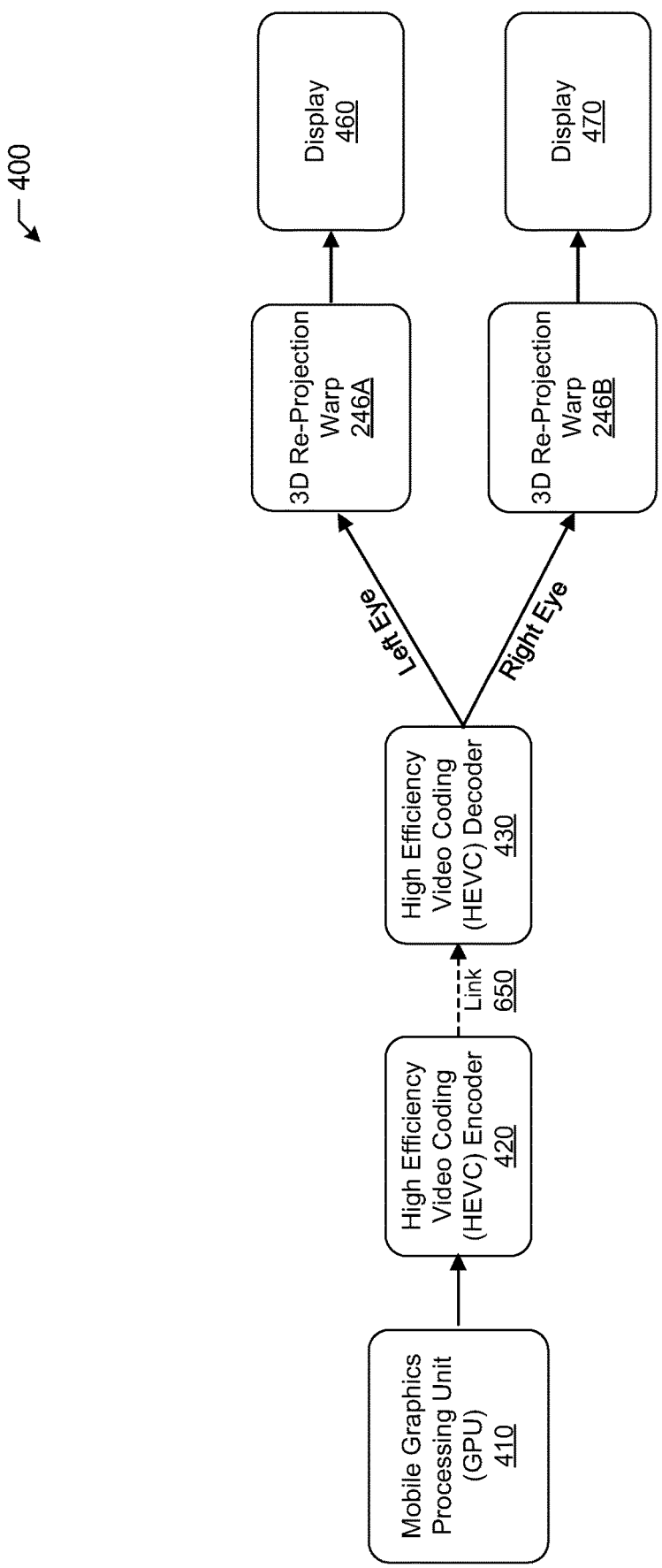
FIG. 4 illustrates a diagram of an example graphics pipeline.

FIG. 4 illustrates a detailed embodiment of an augmented-reality (AR) system 300 with split body architecture, which may be utilized for rendering surfaces on AR device 102. In particular embodiments, mobile graphics processing unit (GPU) 410 of computing device 322 on rendering device 220 may transmit image data containing a plurality of surfaces to a high efficiency video coding (HEVC) encoder 420 of rendering device 220. The HEVC encoder 420 may transmit data via link 650 to a high efficiency video coding (HEVC) decoder 430 of the AR device 102. From HEVC decoder 430, surface data for rendering may be split into two parts, one part of which may travel through the graphics pipeline for display 460 at the left eye, and one part of which may travel through the graphics pipeline for display 470 at the right eye. Once image data comprising the plurality of surfaces has travelled through the respective pipeline, data intended to be transmitted to the left eye may be transmitted to the 3D re-projection warp functional block 246A for display 460 on the AR device 102. Similarly, in particular embodiments, data intended to be transmitted to the right eye may be transmitted to the 3D re-projection warping functional block 246B for display 470 on the AR device 102. In particular embodiments, the 3D re-projection warping functional blocks 246A and 246B may be included in computing device 342 of AR device 102. In particular embodiments, rendering device 202 may output rendered surfaces to the AR device 102, which uses the 3D re-projection warping functional blocks 246A and 246B to compensate for network 104 latency and/or the viewpoint change in the rendered surfaces provided over link 650. In particular embodiments, the rendered and warped surfaces received by the AR device 102 may be passed to the IMU functional block 242 to associate the rendering and warped surfaces with the latest user head pose data and object pose data (e.g., real-time or near real-time head pose data and/or object pose data), for example. The warped surfaces from the rendering device 202 and the locally generated surfaces from the AR device 102 (e.g., generated using the rendering engine 234 and 3D re-projection warp functional block 236) may be passed to the final re-projection warp functional block 246A and 246B for their respective displays 460 and 470 of AR device 102. In particular embodiments, 3D re-projection warping functional blocks 246A and 246B may include a timewarp module for adjusting and compositing the surfaces in accordance with the user's latest viewpoints (e.g., computed based on the latest IMU data from 242). Block 246A for the user's left-eye display 460 may use a viewpoint corresponding to the user's left eye, and Block 246B for the user's right-eye display 470 may use a viewpoint corresponding to the user's right eye. This timewarp adjustment is performed to compensate for potential changes in the user's viewpoints since the time the surfaces were generated. In particular embodiments, the 3D re-projection warping functional blocks 246A and 246B may each include distortion correction block, in which adjustments may be made to the final image before being displayed at display 460 and/or 470. For example, since the lenses, waveguide, and/or display panels of AR device 102 may distort or introduce visible artifacts to the output image, the distortion correction block of 3D re-projection warping functional blocks 246A and 246B may compensate for the anticipated distortions/artifacts (e.g., by applying inverse distortion) to the images before transmitting them to displays 460 and/or 470.

This disclosure contemplates any suitable link 650 wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650.

Figure 5:
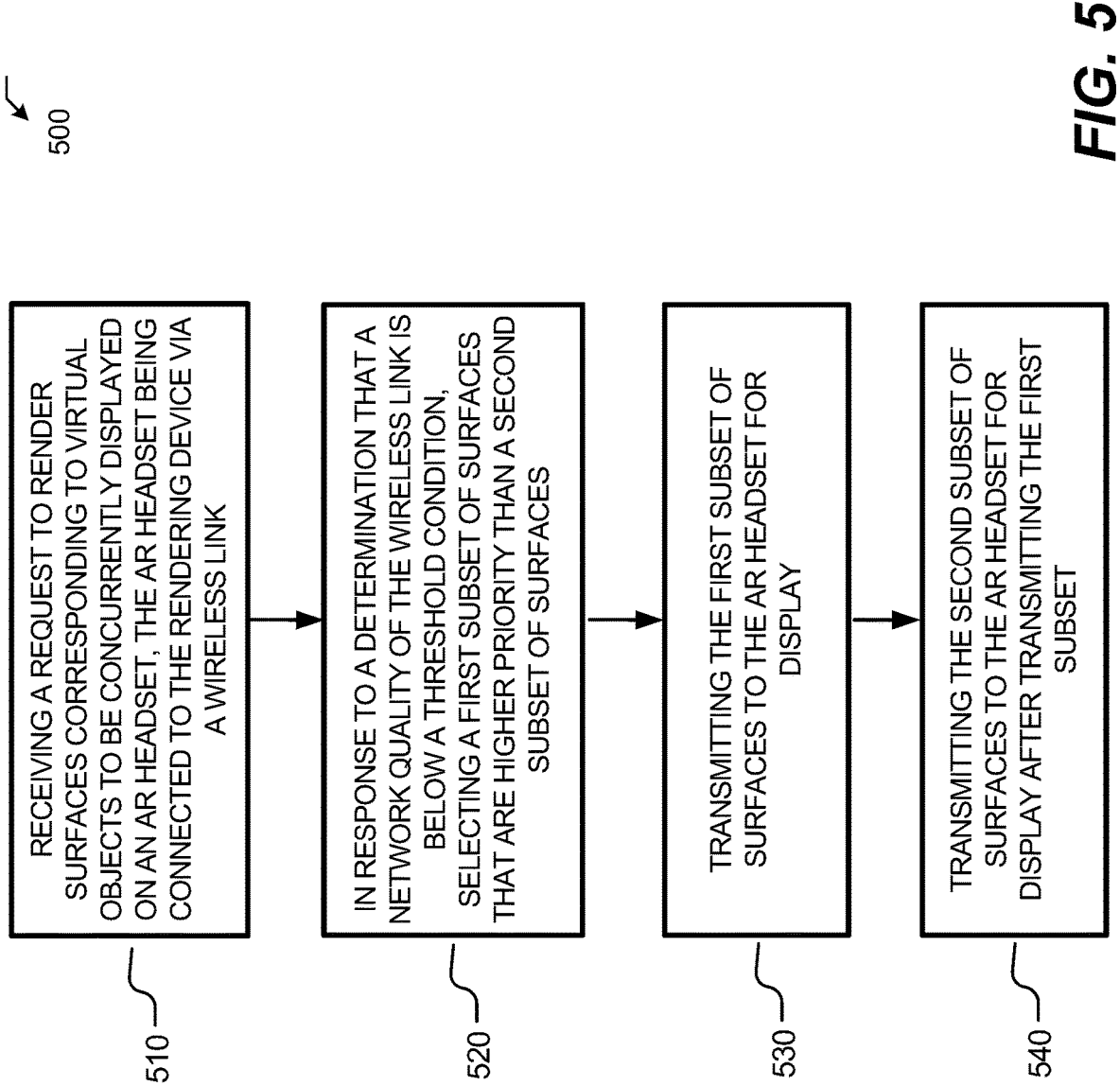
FIG. 5 illustrates an example method of prioritizing and transmitting surfaces.

FIG. 5 illustrates an example method 500 for rendering surfaces according to network 104 conditions. The method may begin at step 510, where rendering device 220 may receive a request to render surfaces corresponding to virtual objects to be concurrently displayed on AR headset or AR device 102. At step 520, in response to a determination that a network 104 quality of the wireless link is below a threshold condition, selecting a first subset of surfaces that are higher priority than a second subset of surfaces. At step 530, rendering device 106 may transmit the first subset of surfaces to the AR device 102 for display. At step 540, rendering device 220 may transmit the second subset of surfaces to the AR device 102 for display after transmitting the first subset, as defined in step 530. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for receiving a request to render surfaces corresponding to virtual objects to be concurrently displayed by AR device 102, where the AR device 102 is connected to rendering device 220 via a wireless link, including the particular steps of the method of FIG. 5, this disclosure contemplates any suitable method for rendering surfaces according to network 104 conditions, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
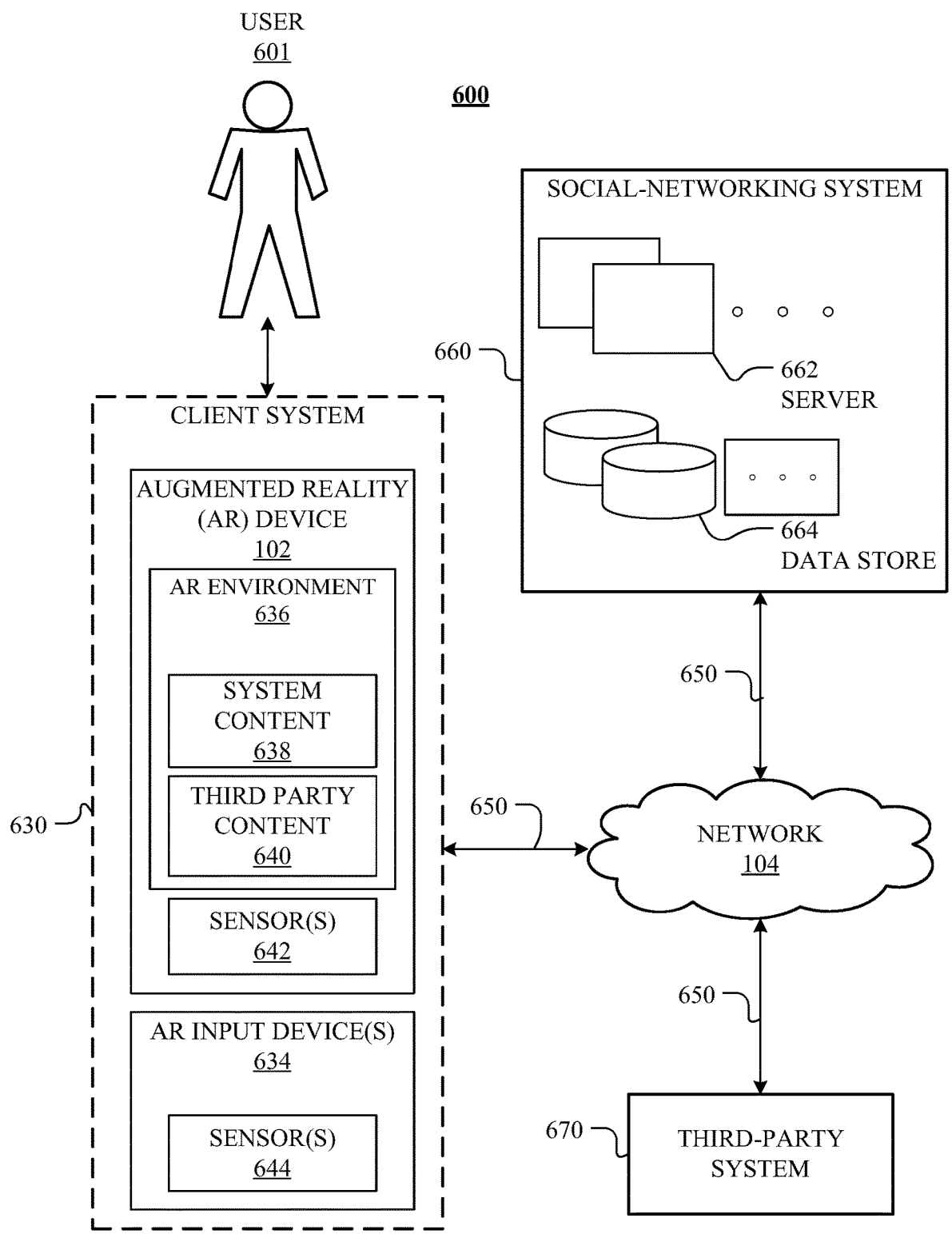
FIG. 6 illustrates an example network environment associated with a social-networking system.

FIG. 6 illustrates an example network environment 600 associated with a social-networking system. Network environment 600 includes a user 601, a client system 630, a social-networking system 660, and a third-party system 670 connected to each other by a network 104. Although FIG. 6 illustrates a particular arrangement of user 601, client system 630, social-networking system 660, third-party system 670, and network 104, this disclosure contemplates any suitable arrangement of user 601, client system 630, social-networking system 660, third-party system 670, and network 104. As an example, and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of users 601, client systems 630, social-networking systems 6610, third-party systems 670, and networks 120, this disclosure contemplates any suitable number of users 601, client systems 630, social-networking systems 660, third-party systems 670, and networks 104. As an example and not by way of limitation, network environment 600 may include multiple users 601, client system 630, social-networking systems 660, third-party systems 670, and networks 104.

In particular embodiments, user 601 may be an individual (human user), an entity (e.g., an enterprise, business, or third-party application), or a group (e.g., of individuals or entities) that interacts or communicates with or over social-networking system 660. In particular embodiments, social-networking system 660 may be a network-addressable computing system hosting an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 104. In particular embodiments, social-networking system 660 may include an authorization server (or other suitable component(s)) that allows users 601 to opt in to or opt out of having their actions logged by social-networking system 660 or shared with other systems (e.g., third-party systems 670), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 660 through blocking, data hashing, anonymization, or other suitable techniques as appropriate. In particular embodiments, third-party system 670 may be a network-addressable computing system that can host surface data. Third-party system 670 may generate, store, receive, and send surface data. Third-party system 670 may be accessed by the other components of network environment 600 either directly or via network 104. In particular embodiments, one or more users 601 may use one or more client systems 630 to access, send data to, and receive data from social-networking system 660 or third-party system 670. Client system 630 may access social-networking system 660 or third-party system 670 directly, via network 104, or via a third-party system. As an example and not by way of limitation, client system 630 may access third-party system 670 via social-networking system 660. Client system 630 may be any suitable rendering device, such as, for example, a personal computer, a laptop computer, a cellular telephone, a smartphone, a tablet computer, or an artificial reality device.

This disclosure contemplates any suitable network 104. As an example and not by way of limitation, one or more portions of network 104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 104 may include one or more networks 104.

Links 650 may connect client system 630, social-networking system 660, and third-party system 670 to communication network 104 or to each other. This disclosure contemplates any suitable links 650. In particular embodiments, one or more links 650 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links & 50 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

Figure 7:
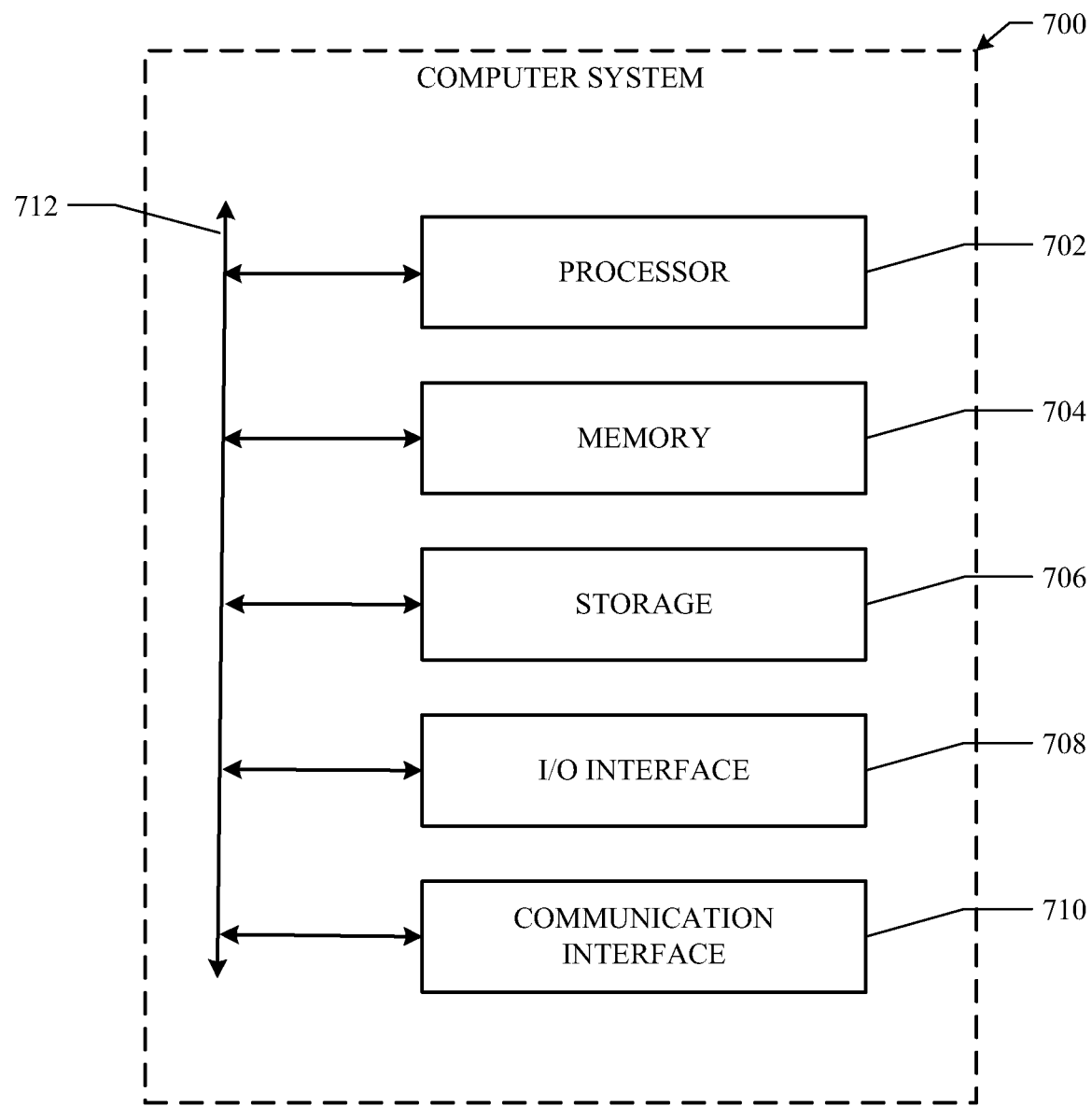
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a rendering device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a rendering device:
   receiving a request to render a plurality of surfaces corresponding to a plurality of virtual objects to be concurrently displayed on an augmented-reality (AR) headset, the AR headset being connected to the rendering device via a wireless link;
   in response to a determination that a network quality of the wireless link is below a threshold condition, selecting a first subset of the plurality of surfaces that are higher priority than a second subset of the plurality of surfaces;
   transmitting the first subset of the plurality of surfaces to the AR headset for display; and
   transmitting the second subset of the plurality of surfaces to the AR headset for display after transmitting the first subset.

2. The method of claim 1, wherein a resolution of the first subset of the plurality of surfaces and second subset of the plurality of surfaces is adjusted in response to the determination that the network quality of the wireless link is below the threshold condition.

3. The method of claim 1, wherein a bit rate of the of the first subset of the plurality of surfaces and second subset of the plurality of surfaces is adjusted in response to the determination that the network quality of the wireless link is below the threshold condition.

4. The method of claim 1, wherein transmitting the first subset of the plurality of surfaces further comprises distributing the first subset of the plurality of surfaces into one or more system intervals.

5. The method of claim 1, wherein selecting the first subset of the plurality of surfaces comprises prioritizing one or more three-dimensional (3D) surfaces of the plurality of surfaces corresponding to the plurality of virtual objects.

6. The method of claim 1, wherein selecting the second subset of the plurality of surfaces comprises two-dimensional (2D) surfaces of the plurality of surfaces corresponding to the plurality of virtual objects.

7. The method of claim 1, further comprising:
   rotating the scheduling of one or more of the plurality of surfaces within the first subset to avoid one surface being consistently dropped.

8. The method of claim 1, further comprising:
   in response to the determination that the network quality of the wireless link is below a threshold condition, generating a plurality of sets of rendering modes consisting of one or more rendering parameters; and
   selecting one of the sets of rendering modes consisting of the one or more rendering parameters based on the network quality of the wireless link; and
   rendering the surface in accordance with the selected set of rendering modes so as to satisfy one or more wireless link constraints.

9. A rendering device comprising:
   one or more displays;

one or more non-transitory computer-readable storage media including instructions; and one or more processors coupled to the storage media, the one or more processors configured to execute the instructions to:

receive a request to render a plurality of surfaces corresponding to a plurality of virtual objects to be concurrently displayed on an augmented-reality (AR) headset, the AR headset being connected to the rendering device via a wireless link;

in response to a determination that a network quality of the wireless link is below a threshold condition, select a first subset of the plurality of surfaces that are higher priority than a second subset of the plurality of surfaces;

transmit the first subset of the plurality of surfaces to the AR headset for display; and transmit the second subset of the plurality of surfaces to the AR headset for display after transmitting the first subset.

10. The rendering device of claim 9, wherein a resolution of the first subset of the plurality of surfaces and second subset of the plurality of surfaces is adjusted in response to the determination that the network quality of the wireless link is below the threshold condition.

11. The rendering device of claim 9, wherein a bit rate of the of the first subset of the plurality of surfaces and second subset of the plurality of surfaces is adjusted in response to the determination that the network quality of the wireless link is below the threshold condition.

12. The rendering device of claim 9, wherein transmitting the first subset of the plurality of surfaces further comprises distributing the first subset of the plurality of surfaces into one or more system intervals.

13. The rendering device of claim 9, wherein selecting the first subset of the plurality of surfaces comprises prioritizing one or more three-dimensional (3D) surfaces of the plurality of surfaces corresponding to the plurality of virtual objects.

14. The rendering device of claim 9, wherein selecting the second subset of the plurality of surfaces comprises two-dimensional (2D) surfaces of the plurality of surfaces corresponding to the plurality of virtual objects.

15. A computer-readable non-transitory storage media comprising instructions executable by a processor to:

receive a request to render a plurality of surfaces corresponding to a plurality of virtual objects to be concurrently displayed on an augmented-reality (AR) headset, the AR headset being connected to the rendering device via a wireless link;

in response to a determination that a network quality of the wireless link is below a threshold condition, select a first subset of the plurality of surfaces that are higher priority than a second subset of the plurality of surfaces;

transmit the first subset of the plurality of surfaces to the AR headset for display; and transmit the second subset of the plurality of surfaces to the AR headset for display after transmitting the first subset.

16. The media of claim 15, wherein a resolution of the first subset of the plurality of surfaces and second subset of the plurality of surfaces is adjusted in response to the determination that the network quality of the wireless link is below the threshold condition.

17. The media of claim 15, wherein a bit rate of the of the first subset of the plurality of surfaces and second subset of the plurality of surfaces is adjusted in response to the determination that the network quality of the wireless link is below the threshold condition.

18. The media of claim 15, wherein transmitting the first subset of the plurality of surfaces further comprises distributing the first subset of the plurality of surfaces into one or more system intervals.

19. The media of claim 15, wherein selecting the first subset of the plurality of surfaces comprises prioritizing one or more three-dimensional (3D) surfaces of the plurality of surfaces corresponding to the plurality of virtual objects.

20. The media of claim 15, wherein selecting the second subset of the plurality of surfaces comprises two-dimensional (2D) surfaces of the plurality of surfaces corresponding to the plurality of virtual objects.

* * * * *